(12) United States Patent
Horiguchi et al.

(10) Patent No.: US 10,801,587 B2
(45) Date of Patent: Oct. 13, 2020

(54) PARALLEL AXIS TYPE TRANSMISSION

(71) Applicant: Kyowa Metal Works Co., Ltd., Kanagawa-ken (JP)

(72) Inventors: Hirotaka Horiguchi, Kanagawa-ken (JP); Kotei Takahashi, Kanagawa-ken (JP); Ryo Yagi, Kanagawa-ken (JP)

(73) Assignee: KYOWA METAL WORKS CO., LTD., Kanagawa-Ken (JP)

( * ) Notice: Subject to any disclaimer, the term of this patent is extended or adjusted under 35 U.S.C. 154(b) by 616 days.

(21) Appl. No.: 15/602,405

(22) Filed: May 23, 2017

(65) Prior Publication Data
US 2017/0343081 A1 Nov. 30, 2017

(30) Foreign Application Priority Data

May 24, 2016 (JP) .................................. 2016-103159
Apr. 21, 2017 (JP) .................................. 2017-084667

(51) Int. Cl.
| | |
|---|---|
| *F16H 3/00* | (2006.01) |
| *F16H 3/08* | (2006.01) |
| *F16H 3/091* | (2006.01) |
| *F16H 3/093* | (2006.01) |
| *F16H 61/04* | (2006.01) |

(52) U.S. Cl.
CPC ............. *F16H 3/093* (2013.01); *F16H 3/006* (2013.01); *F16H 3/08* (2013.01); *F16H 3/091* (2013.01); *F16H 3/0915* (2013.01); *F16H 61/0403* (2013.01); *F16H 2003/0811* (2013.01); *F16H 2003/0933* (2013.01)

(58) Field of Classification Search
CPC ......... F16H 3/006; F16H 3/08; F16H 61/0403
USPC ........................... 74/330, 331, 333, 340, 339
See application file for complete search history.

(56) References Cited

U.S. PATENT DOCUMENTS

| | | | |
|---|---|---|---|
| 7,025,707 B2* | 4/2006 | Katakura | ............ F16H 61/0437 477/123 |
| 2005/0000307 A1* | 1/2005 | Gumpoltsberger | .... B60K 17/08 74/331 |
| 2008/0196543 A1* | 8/2008 | Kobayashi | .............. F16H 3/006 74/664 |
| 2010/0319486 A1* | 12/2010 | Kawamoto | ......... F16H 57/0423 74/665 L |

(Continued)

FOREIGN PATENT DOCUMENTS

| | | |
|---|---|---|
| JP | 2007-534899 | 11/2007 |
| JP | 2008-544161 | 12/2008 |
| JP | 2010-196745 | 9/2010 |

*Primary Examiner* — Ha Dinh Ho

(74) *Attorney, Agent, or Firm* — Wenderoth, Lind & Ponack, L.L.P.

(57) ABSTRACT

A transmission includes a first power transmitting path of gears that obtains odd number speeds and has an output part, a second power transmitting path of gears that obtains even number speeds and has an output part; a first gear shifting part incorporated in the first power transmitting path to obtain one of the odd number speeds, a second gear shafting part incorporated in the second power transmitting path to obtain one of the even number speeds, and a path shifting part that is arranged between the first and second power transmitting parts. The path shifting part shifts the first second power transmitting paths to output power to the output shaft.

20 Claims, 17 Drawing Sheets

(56) References Cited

U.S. PATENT DOCUMENTS

2011/0167957 A1\* 7/2011 Kato ...................... F16D 23/06
 74/665 E

\* cited by examiner

PARALLEL AXIS TYPE TRANSMISSION

BACKGROUND OF THE INVENTION

1. Field of the Invention

The present invention relates to a parallel axis type transmission which is mounted on a motor vehicle to propel the motor vehicle.

2. Description of the Related Art

Conventional parallel axis type transmissions are disclosed in Japanese Unexamined Patent Applications Publication No. 2007-534899, 2008-544161, and 2010-196745. These conventional transmissions include two shifting clutches and two power transmitting path systems. The two power transmitting paths consist of first sets of gears to obtain odd number speeds and second sets of gears to obtain even number speeds. The two power transmitting paths are alternately changed to be shifted by the two shifting clutches. This is, what is called, a dual clutch transmission (DCT).

The above known conventional parallel axis type transmissions, however, encounter a problem in that there are poor choices of layout plans of the parallel axis transmissions because one of the shifting clutches is arranged for the first power transmitting path at one end of the transmission and the other shifting clutch is arranged for the second power transmitting path only at the same side or the other end side of the transmission.

It is, therefore, an object of the present invention to provide a parallel axis type transmission which overcomes the foregoing drawbacks and can provide a great choice of layout plans of parallel axis type transmissions.

SUMMARY OF THE INVENTION

According to an aspect of the present invention there is provided a parallel axis type transmission including one input shaft; one output shaft; a first power transmitting path including drive gears and driven gears, one of the drive gears or the driven gears of the first power transmitting path being rotatable around the input shaft, and the first power transmitting path being capable of obtaining odd number speeds; a second power transmitting path including drive gears and driven gears, at least a part of one of the drive gears or the driven gears of the second power transmitting path being rotatable around the input shaft, and the second power transmitting path being capable of obtaining even number speeds; a first gear shifting part that is incorporated in the first power transmitting path to be shifted between the drive and driven gear pairs of the first power transmitting path so as to be capable of obtaining one of the odd number speeds; a second gear shift part that is incorporated in the second power transmitting path to be shifted between the drive and driven gear pairs of the second power transmitting path so as to be capable of obtaining one of the even number speeds; and a path shifting part that is arranged between the first power transmitting path and at least part of the second power transmitting path and is capable of shifting from one of the first power transmitting path and the second power transmitting path to the other of the first power transmitting path and the second power transmitting path to output power from the input shaft to the output shaft.

Therefore, the transmission provides a great choice of layout plans of the transmissions, and its operating system can become collectively and simply arranged.

Preferably, the first gear shifting part shifts the gears of the first power transmitting path to obtain the odd number speeds, and the second gear shifting part shifts the gears shifts the gears of the second power transmitting path to obtain the even number speeds.

Therefore, a simple construction can be obtained.

Preferably, the path shifting part shifts between the odd number speeds and the even number speeds.

Therefore, its construction can be simplified.

Preferably, the input shaft is connected with a power unit through a starting clutch that outputs the power to the first power transmitting path and the second power transmitting path.

Therefore, it is useful for a motor vehicle on which an internal combustion engine is mounted.

Preferably, the path shifting part employs synchro-mesh type mechanism.

Therefore, it can be smoothly and rapidly shifted, and an inertia of the synchro-mesh mechanism is very small. Therefore, the transmission can suppress cutting off of power transmitting while the path shifting part is shifted, so that a driver cannot feel free running of the motor vehicle.

Preferably, at least one of the first gear shifting part and the second gear shifting part employs a shift sleeve, a hub portion which always engages with the shift sleeve, and a dog clutch gear which is selectively engaged with the shift sleeve, having no synchronizer ring.

Therefore, the transmission can be constructed at a low cost. It does not affect a cutting off period of power transmitting.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
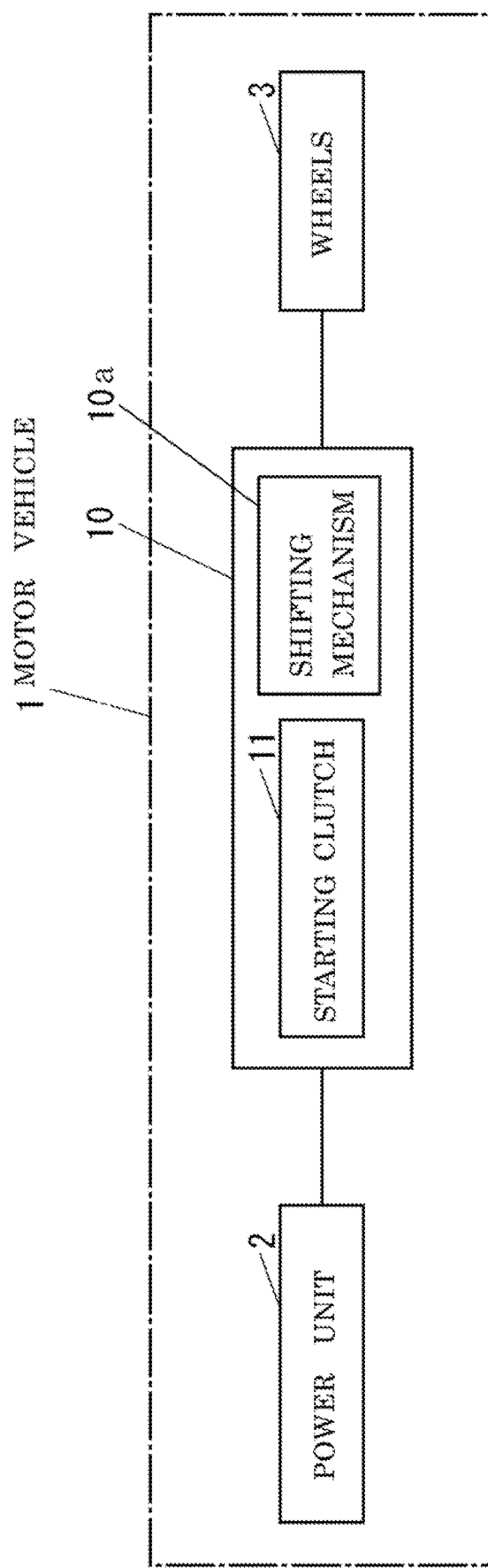
FIG. 1 is a block diagram schematically showing a motor vehicle on which a parallel axis type transmission of a first embodiment according to the present invention is mounted.

Throughout the following detailed description, similar reference characters and numbers refer to similar elements in all figures of the drawings, and their descriptions are omitted for eliminating duplication.

Referring to FIG. 1, a motor vehicle 1 is equipped with a power plant 2, a transmission 10, a not-shown final drive, a not-shown differential gears, wheels 3, and so on. The transmission consists of a starting clutch 11 and a shifting mechanism 10 consisting of gears, gear shifting parts and the like.

The power plant 2 employs an internal combustion engine, an electric motor, or the like. When the electric motor is employed, the starting clutch 11 can be omitted. The transmission 10 changes its rotational speed and its torque. The final drive provides a final reduced gear ratio, and the differential gears enable curving of the motor vehicle.

Figure 2:
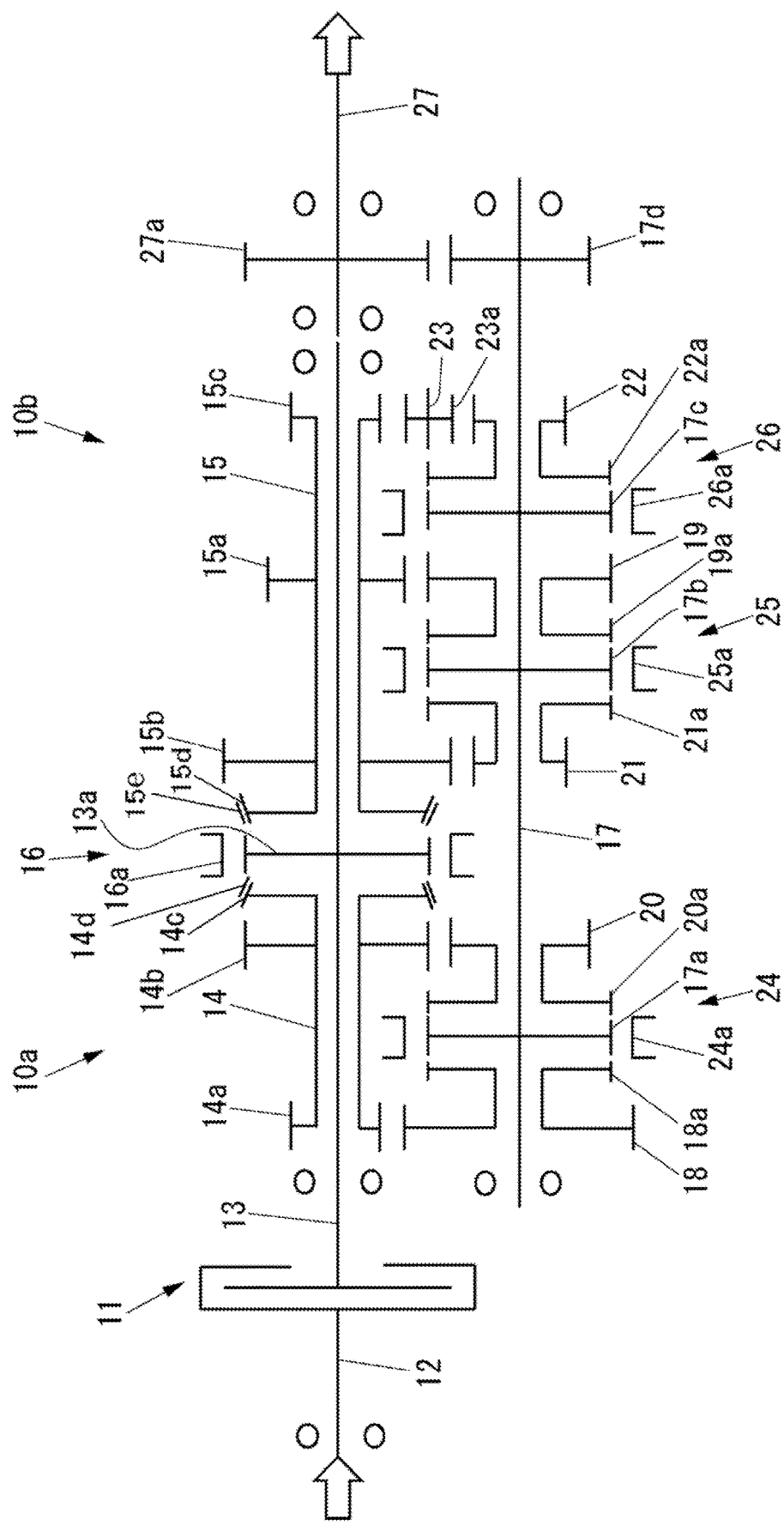
FIG. 2 is a schematic view showing an FR 4-speed parallel axis type transmission of the first embodiment in a case where a path shifting part is a synchromesh type mechanism.

As shown in FIG. 2, there is shown a skeleton of a front engine and rear drive (FR) 4-speed parallel axis type transmission 10.

It has an input shaft 13, an output shaft 27, a counter shaft 17, a first sub-shaft 14, and a second sub-shaft 15.

The input shaft 13 is capable of inputting power from a crank shaft 12 through a stating clutch 11. The crank shaft 12 and the starting clutch 11 may be replaced with an output shaft of an electric motor/generator when the internal combustion engine is replaced with the electric motor.

The input shaft 13 is arranged in a concentric pattern with the crank shaft 12. The output shaft 27 is also arranged in a concentric pattern with the input shaft 13. The counter shaft 17 is arranged parallel with the input shaft 13 and the output shaft 27.

The input shaft 13 has a hub portion 15d forming with splines at its radially outer side as one unit. A first sub-input shaft 14 is arranged in coaxial with the input shaft 13, and it is freely rotatable on the input shaft 13. Similarly, the second sub-shaft 15 is arranged in coaxial with the input shaft 13, and it is freely rotatable on the input shaft 13.

The first sub-shaft 14 is formed with a first drive gear 14a, a third drive gear 14b and a dog clutch gear 14c as one unit. The second sub-shaft 15 is formed with a second drive gear 15a, a fourth drive gear 15b and a dog clutch gear 15d as one unit.

The counter shaft 17 has a hub portion 17a forming with splines at its outer side, a hub portion 17b forming with splines at its outer side, a hub portion 17c forming with splines at its outer side, and a transferring drive gear 17 as one unit.

Incidentally, "O" are bearings in the drawing.

A first driven gear 18 is always engaged with the first drive gear 14a. The first driven gear 18 is formed with a dog clutch gear 18a as one unit, and they are freely rotatable on the counter shaft 17.

A third driven gear 20 is always engaged with the third drive gear 14b. The third driven gear 20 is formed with a dog clutch gear 20a as one unit, and they are freely rotatable on the counter shaft 17.

A second driven gear 19 is always engaged with the second drive gear 15a. The second driven gear 19 is formed with a dog clutch gear 19a as one unit, and they are freely rotatable on the counter shaft 17.

A fourth driven gear 21 is always engaged with the fourth drive gear 15b. The fourth driven gear 21 is formed with a dog clutch gear 21a as one unit, and they are freely rotatable on the counter shaft 17.

The first drive gear 14a and the first driven gear 18 correspond to a first speed gear pair. The second drive gear 15a and the second driven gear 19 correspond to a second speed gear pair. The third drive gear 14b and the third driven gear 20 correspond to a third speed gear pair. The fourth drive gear 15b and the fourth driven gear 21 correspond to a fourth speed gear pair.

A path shift sleeve 16a is formed with splines on its inner surface, and it is always engaged with the splines of the hub portion 13a, so that it is selectively engageable with one of the dog clutch gear 14c and the dog clutch gear 15d. A synchronizer ring 14d is arranged between the dog clutch gear 14c and the hub portion 13a. A synchronizer ring 15e is also arranged between the dog clutch gear 15d and the hub portion 13a. The path shift sleeve 16a, the hub portion 13a, the dog clutch portions 14c and 15d, the synchronizer rings 14d and 15e and cone portions next to the dog clutch gears 14c and 15d comprise a synchro-mesh type mechanism, and they correspond to a path shifting part 16 of the present invention.

A first shift sleeve 24a is always engaged with the splines of the hub portion 17a, and it is selectively engageable with one of the dog clutch gears 18a and the dog gear clutch 20a, being selectively not engageable with them. The first shift sleeve 24a, the hub portion 17a and the dog clutch portions 18a and 20a correspond to a first gear shifting part 24 of the present invention.

A second shift sleeve 25a is always engaged with the splines of the hub portion 17b, and it is selectively engageable with one of the dog clutch gear 19a and the dog clutch gear 21a, being selectively not engageable with them. The second shift sleeve 25a, the hub portion 17b and the dog clutch portions 19a and 21a correspond to a second gear shifting part 25 of the present invention.

A reverse driven gear 22 is freely rotatable on the counter shaft 17, and it has a dog clutch gear 22a. A reverse shift sleeve 26a is always engaged with splines of the hub portion 17c on its radially outer side, and it is selectively engageable with the dog clutch gear 22a. The reverse driven gear 22 is engageable with a reverse idle gear 23a. The reverse idle gear 23a is freely rotatable on a reverse shaft 23 fixed to a not-shown transmission housing, and it is further engageable with a reverse drive gear 15c which is formed with the second sub-shaft 15 as one unit. The reverse shift sleeve 26a, and the hub portion 17c and the dog clutch gear 22a correspond to a reverse shifting part 26.

The transferring drive gear 17d is always engaged with a transferring driven gear 27a formed with the output shaft 27 as one unit.

The path shifting part 16, the first gear shifting part 24, the second gear shifting part 25, and the reverse shifting part 26 are operated by an operating system 30 as follows.

Figure 3:
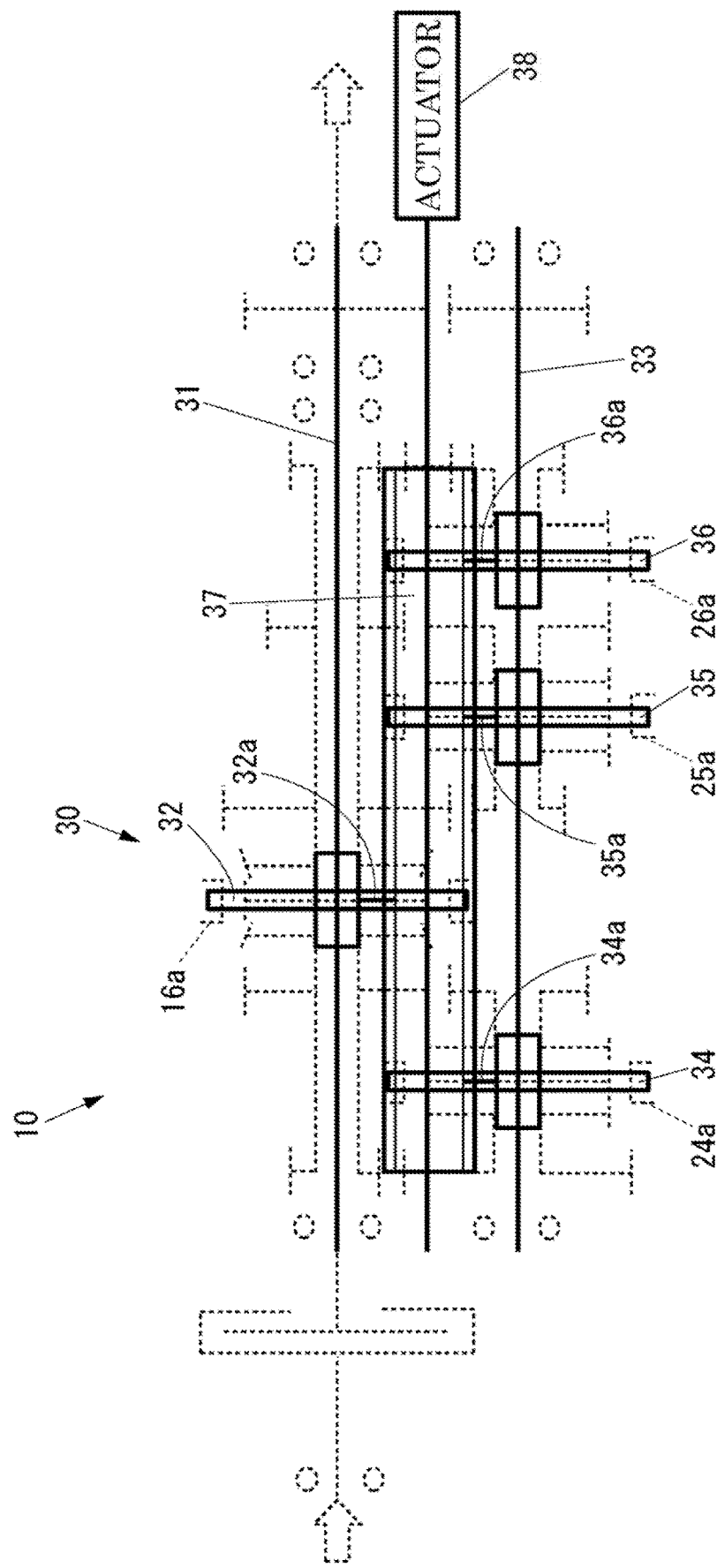
FIG. 3 is a schematic view showing an operation system of the parallel axis type transmission shown in FIG. 2.
Figure 4:
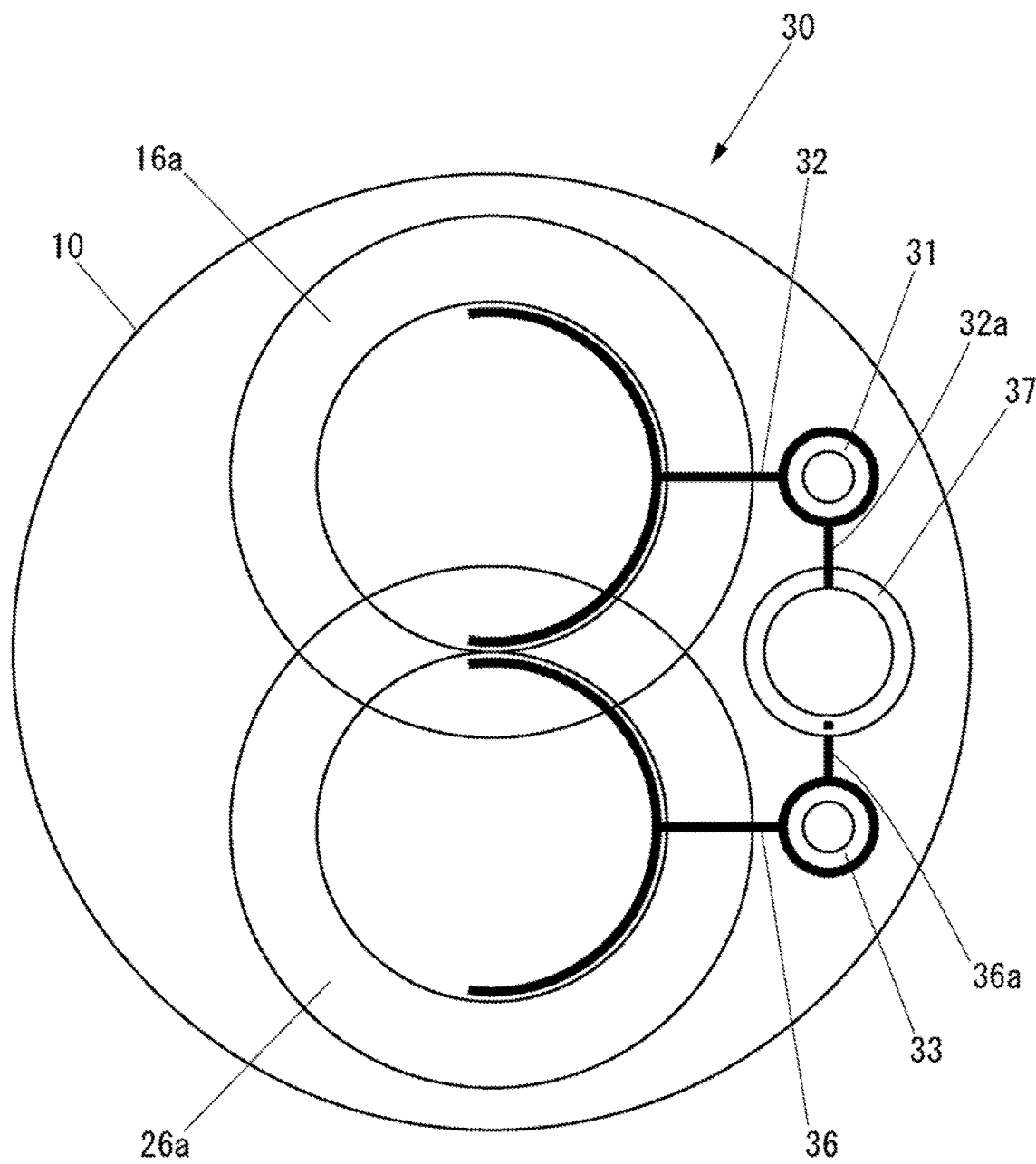
FIG. 4 is a schematic side view showing the operation system shown in FIGS. 2 and 3.

As shown in FIGS. 3 and 4, a first control rod 31, a second control rod 33, and a third control rod 37 extend in a longitudinal direction and at radially outer side of the path shifting part 16, the first gear shifting part 24, the second gear shifting part 25, and the reverse shifting part 26. The third control rod 37 is arranged between the first control rod 31 and the second control rod 33.

The first control rod 31 has a path shift fork 32 at a position corresponding to the path shifting part 16. The path shift fork 32 is always engaged with a circumferential groove formed on an outer side of the path shift sleeve 16a. The second control rod 33 has a first shift fork 34, a second shift fork 35, and a reverse shift fork 36. The first shift fork 34 is fixed to the second control rod 33 at a position corresponding to the first gear shifting part 24. The second shift fork 35 is fixed to the second control rod 33 at a position corresponding to the second gear shifting part 25. The reverse shift fork 36 is fixed to the second control rod 33 at a position corresponding to the reverse shifting part 26.

The third control rod 37 has four grooves at certain positions, one of the four grooves is engageable with the path shift fork 32, a second one of the four grooves is engageable with the first shift fork 34, a third one of the four grooves is engageable with the second shift fork 35, and a fourth one of the four grooves is engageable with the reverse fork 36. The third rod 37 is rotatable by an actuator 38. The four grooves are formed appropriately, so that one of the shift forks 32, 34, 35, and 36 can be moved in the axial direction by selecting the one according to a rotational angle of the actuator 38.

Figure 5:
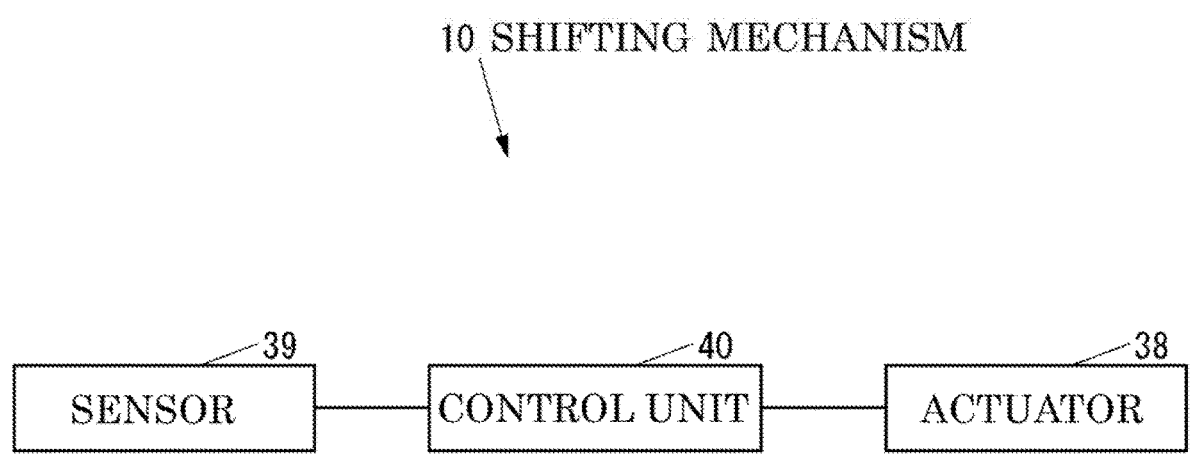
FIG. 5 is a block diagram showing a control system of the parallel axis type transmission shown in FIGS. 2 to 4.

FIG. 5 shows a control system of the 4-speed parallel axis type transmission.

Sensors 39 are electrically connected to a controller 40, which outputs a control signal to the actuator 38. The sensors 39 employ a vehicle speed sensor, an accelerator pedal opening angle sensor, and so on. The controller 40 has a Central Processing Unit (CPU) that process calculations, a Read Only Memory (ROM) that stores programs and data, and a Random Access Memory (RAM) that uses a working area of the CPU.

The operation of the parallel axis type transmission 10 will be described below.

At a neutral position, the path shift sleeve 16a is shifted with the dog clutch gear 14c The shift sleeves 24, 25a and 26a are not engaged with the dog clutch gears 18a, 20a, 19a, 21a and 22a, while the first shift sleeve 24a may be engaged with the dog clutch gear 18a in preparation for a next operation. In this state, the input shaft 14 is separated off from the output shaft 27. Incidentally, the starting clutch 11 is released.

In order to obtain first speed, the starting clutch 11 is kept released. The first shift fork 34 is moved toward a left side in FIG. 2, and the first shift sleeve 24a is engaged with the dog clutch gear 18a of the first driven gear 18. Then the path shift fork 16a is moved toward the left side to engage with the dog clutch gear 14c. Then the starting clutch 11 is slipped and then completely engaged.

This enables the input shaft 13 to be connected with the first sub-shaft 14 to rotate together. The first sub-shaft 14 rotates the first drive gear 14a. Then the first drive gear 14a rotates the first driven gear 18, and its rotation is transmitted through the dog clutch gear 18a, the first shift sleeve 24a and the hub portion 17a to the counter shaft 17. The counter shaft 17 rotates the transferring drive gear 17d, which rotates the transferring gear 27a and the output shaft 27. That is, the output shaft 27 rotates at the first speed In order to obtain second speed from the first speed, the second shift fork 35 is moved toward a right side in FIG. 2, and the second shift sleeve 25a is engaged with the dog clutch gear 19a of the second driven gear 19a. In this operation, as the second shift sleeve 25a and the second driven gear 19 are not driven, it is easily and smoothly shifted without a synchronizer ring. Until the second shift sleeve 25a is engaged with the dog clutch gear 18a, the second shift sleeve 24a is still engaged with the dog clutch gear 18a of the first driven gear 18, and the path shift sleeve 16a is still engaged with the dog clutch gear 14c.

Immediately after the second sift sleeve 25a is engaged with the dog clutch gear 19a of the second driven gear 19, the second shift fork 32 is moved toward the right side so that the path shift sleeve 16a is engaged with the dog clutch gear 15d, separating off from the dog clutch gear 14c. This enables the input shaft 13 to be connected with the second sub-shaft 15. Incidentally, while the path shift sleeve 16a is shifted, the starting clutch 11 is instantaneously released.

The second sub-shaft 15 is driven by the input shaft 13 to rotate the second drive gear 15a. The second drive gear 15a rotates the second driven gear 19. The rotation of the second driven gear 19 is transmitted to the dog clutch gear 19a, then through the second shift sleeve 25a and the hub portion 17b to the counter shaft 17. The counter shaft 17 rotates the transferring drive gear 17d, which rotates the transferring driven gear 27a and the output shaft 27. That is, the output shaft 27 rotates at the second speed. Incidentally, after the path shift sleeve 16a is engaged with the dog clutch gear 15d, the first shift fork 34 may be moved toward the right side to be positioned at a neutral position.

In order to obtain third speed from the second speed, the first shift fork 34 is moved toward the right side, and the first shift sleeve 24a is engaged with the dog clutch gear 20a of the third driven gear 20. In this operation, as the first shift sleeve 24a and the third driven gear 20 are not driven, it is easily and smoothly shifted without a synchronizer ring. Until the first shift sleeve 24a is engaged with the dog clutch gear 20a, the second shift sleeve 25a is still engaged with the dog clutch gear 19a of the second driven gear 19, and the path shift sleeve 25a is still engaged with the dog clutch gear 15d.

Immediately after the first shift sleeve 24a is engaged with the dog clutch gear 20a of the third driven gear 20, the path shift fork 32 is moved toward the left side so that the path shift sleeve 16a is engaged with the dog clutch 14c, separating off from the dog clutch gear 15d. This enables the input shaft 3 to be connected with the first sub-shaft 14.

The first sub-shaft 14 is driven by the input shaft 13 to rotate the third drive gear 14b. The rotation of the third driven gear 20 is transmitted to the dog clutch gear 20a, then through the shift sleeve 24a and the hub portion 17a to the counter shaft 17. The counter shaft 17 rotates the transferring drive gear 17d, which rotates the transferring driven gear 27a and the output shaft 27. That is, the output shaft 27 rotates at the third speed. Incidentally, after the path shift sleeve 16a is engaged with the dog clutch gear 14c, the second shift fork 35 may be moved toward the left side to be positioned at a neutral position. While the path shifting sleeve 16a is shifted, the starting clutch 11 is instantaneously released.

In order to obtain fourth speed from the third speed, the second shift fork 35 is moved toward the left side, and the second shift sleeve 25a is engaged with the dog clutch gear 21a of the fourth driven gear 21. In this operation, as the second shift sleeve 25a and the fourth driven gear 21 are not driven, it is easily and smoothly shifted without a synchronizer ring. Until the second shift sleeve 25a is engaged with the dog clutch gear 21a, the first shift sleeve 24a is still engaged with the dog clutch 20a of the third driven gear 20, and the path shift sleeve 16a is still engaged with the dog clutch gear 14c.

Immediately after the second shift sleeve 25a is engaged with the dog clutch gear 21a of the fourth driven gear 21, the path shift fork 32 is moved toward the right side so that the path shift sleeve 16a is engaged with the dog clutch gear 15d, separating off from the dog clutch 14c. This enables the input shaft 13 to be connected with the second sub-shaft 15.

The second sub-shaft 15 is driven by the input shaft 13 to rotate the fourth drive gear 15b. The fourth drive gear 15b rotates the fourth driven gear 21. The rotation of the fourth driven gear 21 is transmitted to the dog clutch gear 21a, then through the shift sleeve 25a and the hub portion 17b to the counter shaft 17. The counter shaft 17 rotates the transferring drive gear 17d, which rotates the transferring driven gear 27a and the output shaft 27. That is, the output shaft 27 rotates at the fourth speed. Incidentally, after the path shift sleeve 16a is engaged with the dog clutch gear 15d, the first shift fork 34 may be moved toward the left side to be positioned at a neutral position. While the path shift sleeve 16a is sifted, the starting clutch 11 is instantaneously released.

Down-shifts from the fourth speed to the third speed, the third speed to the second speed, and the second speed to the first speed are accomplished in the opposite direction to the above-described operation.

In order to obtain reverse speed, the reverse shift fork 36 is moved toward the right side, and the reverse shift sleeve 26a is engaged with the dog clutch gear 22a of the reverse driven gear 22. Then the path shift fork 32 is moved toward the right side so that the path shift sleeve 16a is engaged with the dog clutch gear 15d, separating off from the dog clutch gear 14c. This enables the input shaft 13 to be connected with the second sub-shaft 15. Incidentally, after the path shift sleeve 16a is shifted, the starting clutch 11 is slipped after it is released, and then completely engaged.

The second sub-shaft 15 is driven by the input shaft 13 to rotate the reverse drive gear 15c. The reverse drive gear 15c rotates the reverse idle gear 23a, which rotates the reverse driven gear 22. The rotation of the reverse driven gear 22 is transmitted to the dog clutch gear 22a, then through the shift sleeve 26a and the hub portion 17c to the counter shaft 17. The counter shaft 17 rotates the transferring drive gear 17d, which rotates the transferring driven gear 27a and the output shaft 27. That is, the output shaft 27 rotates at the reverse speed.

The paths to obtain the first speed and the third speed correspond to a first power transmitting path 10a of the present invention, and the paths to obtain the second speed and the fourth speed correspond to a second power transmitting part 10b of the present invention.

As described above, the parallel axis type transmission of the first embodiment has the following advantages.

The path shifting part 16 is arranged between the first power transmitting path 10a and the second power transmitting path 10b. Therefore, the transmission provides a great choice of layout plans of the transmissions, and the operation system 30 can be collectively and easily arranged.

The path shifting part 16 employs the synchro-mesh type mechanism. Therefore, its diameter can be smaller to decrease its moment of inertia, and it does not necessary for provide the power for its engagement while it is activated. Due to this reason, the transmission can be compact and light in weight.

The path shifting part 16 can be shifted after the dog clutch gear 18a, (or 22a, 20a, 21a) of the next on-coining gear is engaged with its shift sleeve 24a (or 25a), and accordingly the gear changing can be accomplished in a very short time. Therefore, the starting clutch 11 can be released in a very short time, and the transmission hardly generates cut off of power so that a driver cannot feel free running of the motor vehicle.

The first gear shifting part 24 and the second gear shifting part 25 include the shift sleeves 24a and 25a, the hub portions 17a and 17b, and the dog gear clutches 18a, 19a, 20a and 21a. These parts have neither a cone portion nor a synchronizer ring. Therefore, the gear shifting part can be decreased in cost and weight.

The transmission 10 does not necessary for an oil circuit. This decreases in cost and in weight, improving its fuel efficiency.

Figure 6:
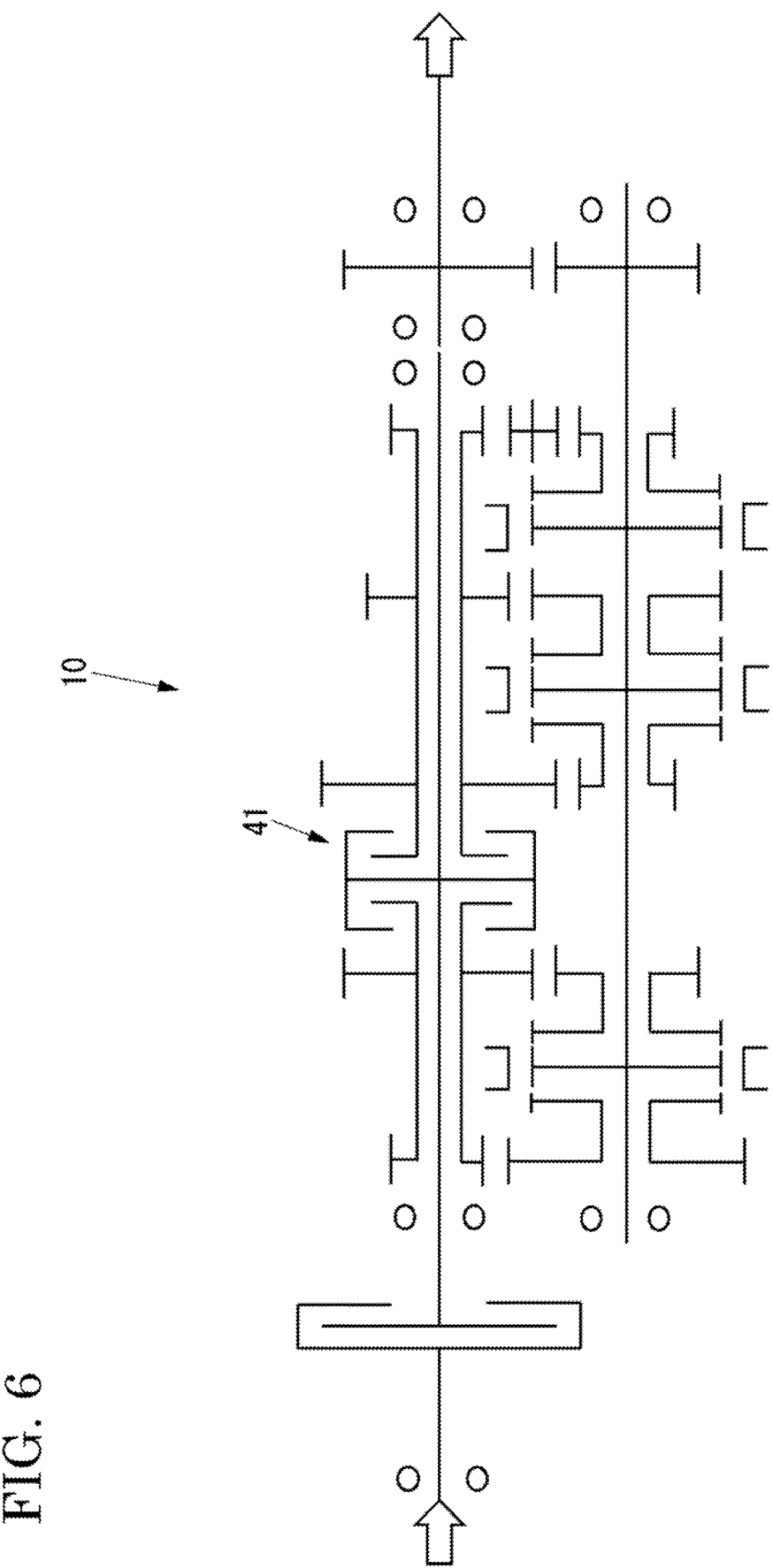
FIG. 6 is a schematic view showing a modified first embodiment where the path shifting part is a pair of disc clutch instead of the synchromesh type mechanism.

Next, FIG. 6 is a modified embodiment of the first embodiment.

The path shifting part 16 of the first embodiment may be replaced by a different type clutch, disc clutches 41 for example. FIG. 6 shows a transmission having a pair of disc clutches 41 as the power shifting part.

A transmission of the modified first embodiment provides a great choice of layout plans of the transmissions, and the operation system can be collectively and easily arranged.

Next, a transmission of a second embodiment according to the present invention will be described below.

Figure 7:
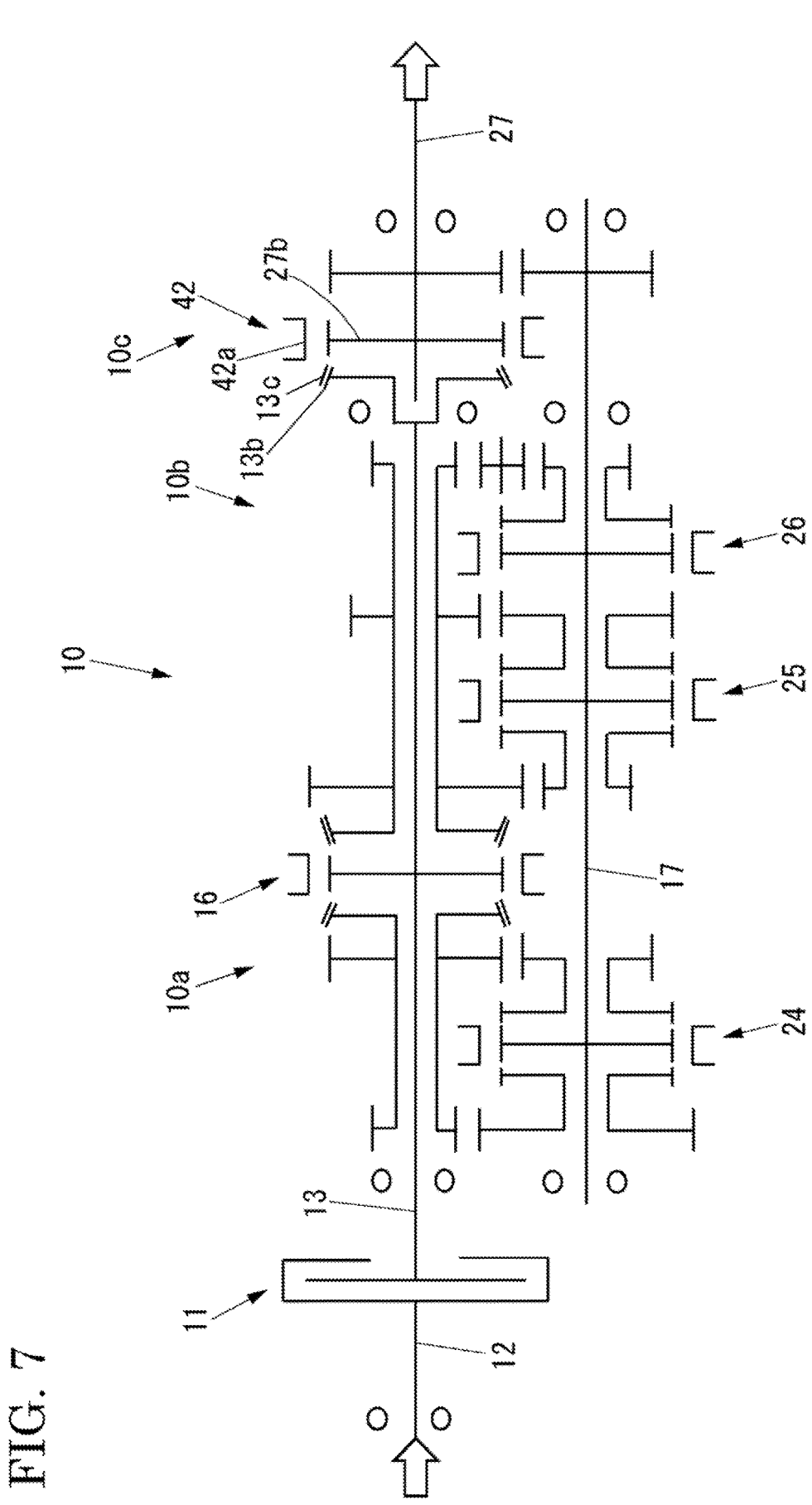
FIG. 7 is a schematic view showing an FR 5-speed parallel axis type transmission of a second embodiment according to the present invention.

FIG. 7 shows an FR 5-speed parallel axis type transmission of the second embodiment. The input shaft 13 further has a dog clutch gear 13b with a not-shown cone portion next to the dog clutch 13b. The output shaft 27 further has a hub portion 27b with splines on its radially outer side. A third shift sleeve 42a is always engaged with the hub portion 27b, and it is selectively engaged with the dog clutch gear 13b. A synchronizer ring 13c is arranged between the dog clutch gear 13b and the hub portion 27b. The third shift sleeve 42a, the synchronizer ring 13c, the hub portion 27b, the cone portion and the dog clutch gear 13b correspond to a third power shifting part 42 of the present invention. The other parts and portions are similar to those in the first embodiment.

The paths to obtain the first speed, the third speed, and the fifth speed correspond to the first power transmitting path of the present invention, and the paths to obtain the second speed and the fourth speed correspond to the second power transmitting path of the present invention.

The operation of the second embodiment will be described below.

The operation from the neutral to the fourth speed is the same as that of the first embodiment.

In order to obtain fifth speed from the fourth speed, the path shift sleeve 16a is disengaged from the dog clutch gears 14c and 15d, and then the third shift sleeve 42a is moved toward the left side in FIG. 7 to engage the third shift sleeve 42a with the dog clutch gear 13b. The second shift sleeve 25 may be moved toward the right side to separate off from the dog clutch gear 21*a*. While the path shifting part 16 and the third gear shifting part are shifted, the starting clutch is instantaneously released.

This enables the input shaft 13 to rotate the output shaft 27 together, that is, directly drive the output shaft 27. The output shaft 26 rotates at the fifth speed.

The transmission of the second embodiment has the same advantages as those of the first embodiment in addition to the following one.

The transmission can provide the fifth speed.

By the way, the third power shifting part 42 may be arranged on the counter shaft 17 instead of a layout of the second embodiment.

Next, a transmission of a third embodiment according to the present invention will be described below.

Figure 8:
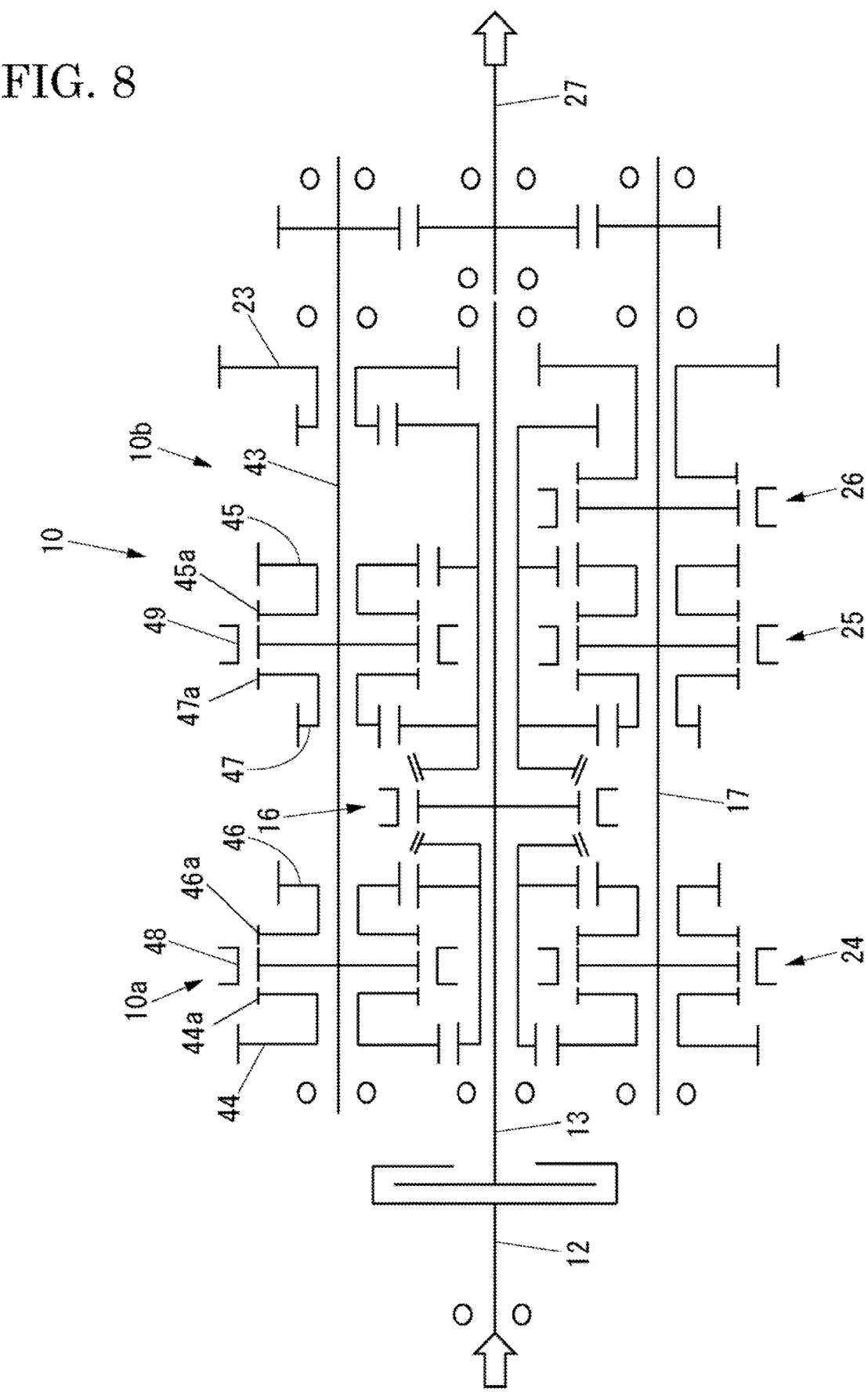
FIG. 8 is a schematic view showing an FR 8-speed parallel axis type transmission of a third embodiment according to the present invention.

FIG. 8 is an FR 8-speed parallel axis type transmission of the third embodiment. This transmission 10 is obtained by adding other power shifting parts to that of the first embodiment.

A first counter shaft 17, corresponding to the counter shaft 17 of the first embodiment, is arranged parallel to the input shaft 13. A second counter shaft 43 is arranged parallel to the input shaft 13 and the first counter shaft 17.

A fifth driven gear 44 is always engaged with the first drive gear 14*a*. The fifth driven gear 44 is formed with a dog clutch gear 44*a* as one unit, and they are freely rotatable on the second counter shaft 43.

A seventh driven gear 46 is always engaged with the third drive gear 14*b*. The seventh driven gear 46 is formed with a dog clutch gear 46*a* as one unit, and they are freely rotatable on the second counter shaft 43.

The first drive gear 14*a*, the fifth driven gear 44, the third drive gear 14*b* and the seventh driven gear 46 correspond to a first power transmitting path. The first power transmitting part further includes the first drive gear 14*a*, the first driven gear 18, the third drive gear 14*b* and the third driven gear 20.

A sixth driven gear 45 is always engaged with the second drive gear 15*a*. The sixth driven gear 45 is formed with a dog clutch gear 45*a* as one unit, and they are freely rotatable on the second counter shaft 43.

An eighth driven gear 47 is always engaged with the fourth drive gear 15*b*. The eighth driven gear 47 is formed with a dog clutch gear 47*a* with one unit, and they are freely rotatable on the second counter shaft 43.

The second drive gear 15*a*, the sixth driven gear 45, the fourth drive gear 15*b* and the eighth driven gear 47 correspond to a second power transmitting path. The second power transmitting part further includes the second drive gear 15*a*, the second driven gear 19, the fourth drive gear 15*b* and the fourth driven gear 21.

A third shift sleeve 48*a* is always engaged with a hub portion 43*b* of the second counter shaft 43. The third shift sleeve 48*a* is selectively engaged with one of the dog clutch gears 44*a* and 46*a*, being selectively separated off from the dog clutch gears 44*a* and 46*a*. The dog clutch gears 44*a* and 46*a*, the hub portion 43*b* and the third shift sleeve 48*a* correspond to a third gear shifting part 48.

A fourth shift sleeve 49*a* is always engaged with a hub portion 43*c* of the second counter shaft 43. The fourth shift sleeve 49*a* is selectively engageable with one of the dog clutch gears 45*a* and 47*a*, being selectively separated off from the dog clutch gears 45*a* and 47*a*. The dog clutch gears 45*a* and 47*a*, the hub portion 43*c* and the fourth shift sleeve 49*a* correspond to a fourth gear shifting part 49.

The second sub-shaft 15 has the reverse drive gear 15*c*, which is engaged with a first reverse idle gear 23*b*. The first reverse idle gear 23*b* is formed with a second reverse idle gear 23*c* as one unit, and they are freely rotatable on the second counter shaft 43. The second reverse idle gear 23*c* is engaged with the reverse driven gear 22 that is freely rotatable on the first counter shaft 17. The reverse driven gear 22 is formed with the dog clutch gear 22*a* as one unit, which is selectively engageable with the reverse shift sleeve 26*a* that is engageable with the hub portion 17*c* of the first counter shaft 17, being selectively separated off from the hub portion 17*c*.

The operation of the transmission 10 of the third embodiment will be described below.

The operation from the neutral position to the fourth speed is the same as that of the first embodiment.

In order to obtain fifth speed from the fourth speed, the third shift sleeve 48*a* is moved to the left side to engage with the dog clutch gear 44*a*. Then the path shift sleeve 16*a* is moved toward the left side to engage with the dog clutch 14*c*. This enables the input shaft 13 to drive the first drive gear 14*a*. The first drive gear 14*a* rotates the fifth driven gear 44, and the dog clutch gear 44*a* rotates the second counter shaft 43 through the third shift sleeve 48*a* and the hub portion 43*b*. The second counter shaft 43 rotates the transfer drive gear 43*a*, which rotates the transfer driven gear 27*a* and the output shaft 27. That is, the output shaft 27 rotates at the fifth speed.

Incidentally, the second shift sleeve 25*a* may be moved to the right side to be positioned at the neutral position after the path shifting part 16 is shifted to the left side. While the path shift sleeve 16*a* is shifted, the starting clutch 11 is instantaneously released.

In order to obtain sixth speed from the fifth speed, the fourth shift sleeve 49*a* is moved to the right side to engage with the dog clutch gear 45*a*. Then the path shift sleeve 16*a* is moved toward the right side to engage with the dog clutch 15*d*. This enables the input shaft 13 to drive the second drive gear 15*a*. The second drive gear 15*a* rotates the sixth driven gear 45, and the dog clutch gear 45*a* rotates the second counter shaft 43 through the third shift sleeve 49*a* and the hub portion 43*c*. The second counter shaft 43 rotates the transfer drive gear 43*a*, which rotates the transfer driven gear 27*a* and the output shaft 27. That is, the output shaft 27 rotates at the sixth speed.

Incidentally, the third shift sleeve 48*a* may be moved to the right side to be positioned at the neutral position after the path shifting part 16 is shifted to the right side. While the path shift sleeve 16*a* is shifted, the starting clutch 11 is instantaneously released.

In order to obtain seventh speed from the sixth speed, the third shift sleeve 48*a* is moved to the right side to engage with the dog clutch gear 46*a*. Then the path shift sleeve 16*a* is moved toward the left side to engage with the dog clutch 14*c*. This enables the input shaft 13 to drive the third drive gear 14*b*. The third drive gear 14*b* rotates the seventh driven gear 46, and the dog clutch gear 46*a* rotates the second counter shaft 43 through the third shift sleeve 48*a* and the hub portion 43*b*. The second counter shaft 43 rotates the transfer drive gear 43*a*, which rotates the transfer driven gear 27*a* and the output shaft 27. That is, the output shaft 27 rotates at the seventh speed.

Incidentally, the fourth shift sleeve 49*a* may be moved to the left side to be positioned at the neutral position after the path shifting part 16 is shifted to the left side. While the path shift sleeve 16*a* is shifted, the starting clutch 11 is instantaneously released.

In order to obtain eighth speed from the seventh speed, the fourth shift sleeve 49*a* is moved to the left side to engage with the dog clutch gear 47a. Then the path shift sleeve 16a is moved toward the right side to engage with the dog clutch 15d. This enables the input shaft 13 to drive the fourth drive gear 15d. The fourth drive gear 15b rotates the eighth driven gear 47, and the dog clutch gear 47a rotates the second counter shaft 43 through the fourth shift sleeve 49a and the hub portion 43c. The second counter shaft 43 rotates the transfer drive gear 43a, which rotates the transfer driven gear 27a and the output shaft 27. That is, the output shaft 27 rotates at the eighth speed.

Incidentally, the third shift sleeve 48a may be moved to the left to be positioned at the neutral position after the path shifting part 16 is shifted to the right side. While the path shift sleeve 16a is shifted, the starting clutch 11 is instantaneously released.

In order to obtain reverse speed, the starting clutch 11 is released. The reverse shift sleeve 26a is moved toward the right side to engage with the dog clutch gear 22a. Then the path shift sleeve 16 is moved toward the right side to engage with the dog clutch 15d. The dog clutch gear 15d drives the reverse drive gear 15c, which rotates the first reverse idle gear 23b. The first reverse idle gear 23b rotates the second reverse idle gear 23c, which rotes the reverse driven gear 22 and the dog clutch gear 22a. The dog clutch gear 22a rotates the first counter shaft 17 through the reverse shift sleeve 26a and the hub portion 17c. The first counter shaft 17 rotates the transferring drive gear 17d, which rotates the transferring driven gear 27a and the output shaft 27. That is, the output shaft 27 rotates at the reverse speed.

Incidentally, after the path shift sleeve 16c is shifted, the starting clutch 11 is slipped, and then it is completely engaged.

The transmission 10 of the third embodiment has the same advantages as those of the first embodiment in addition to the following one.

It provides eight speeds. The transmission 10 can provide any other speed more than the four speeds.

Next, a transmission of a fourth embodiment according to the present invention will be described below.

Figure 9:
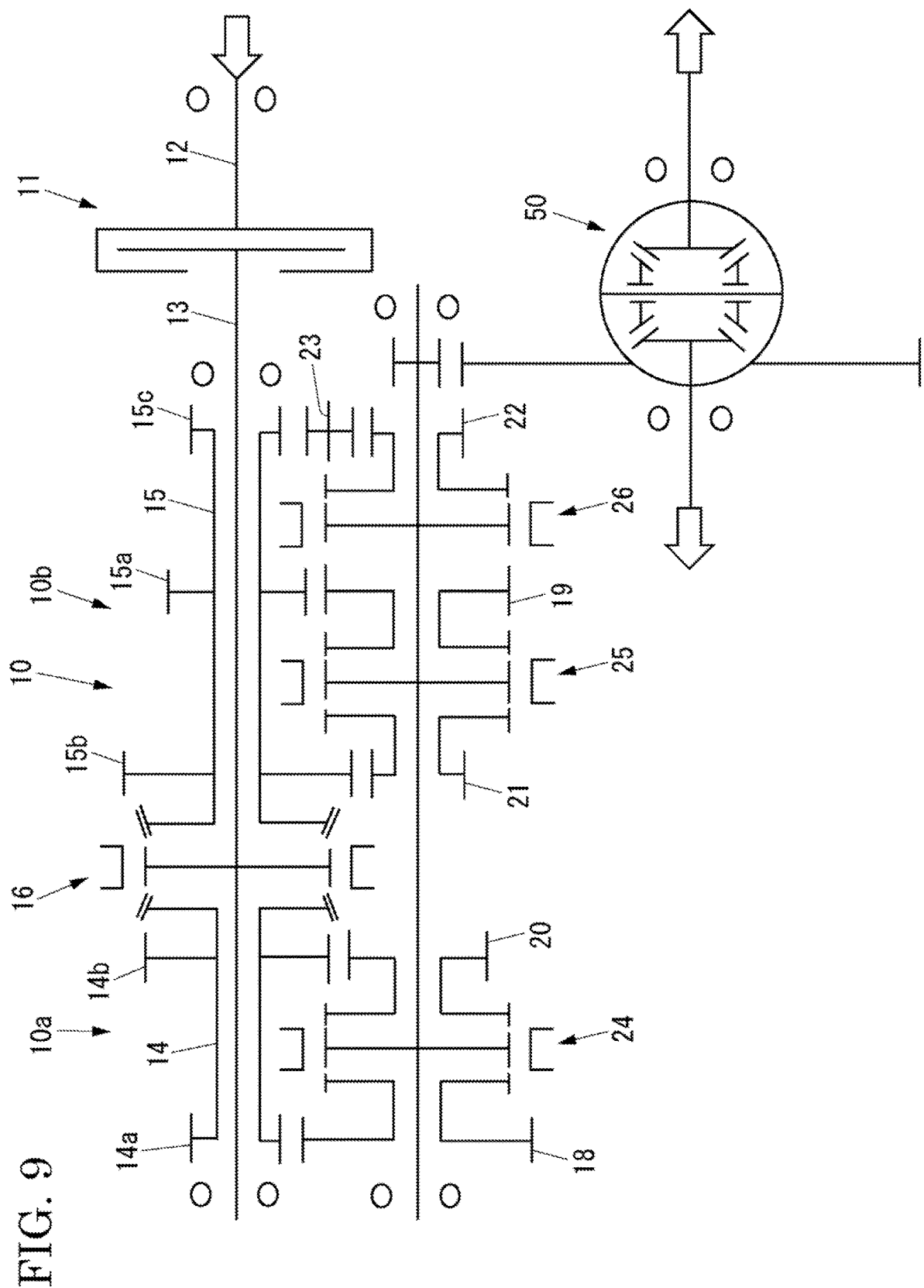
FIG. 9 is a schematic view showing an μF 4-speed parallel axis type transmission of a fourth embodiment according to the present invention.

FIG. 9 shows the fourth embodiment, and it is applied for a front engine and front drive (FF) motor vehicle. The transmission in FIG. 9 is basically the same as those of the first embodiment shown in FIG. 2.

The input shaft 13 is connected with the crank shaft 12 through the starting clutch 11 at the right side of the input shaft 13.

The counter shaft 17 has an output drive gear 51a, which is engaged with an output driven gear 52a. The output driven gear 52b is connected with differential gears 50. The differential gears 50 are connected with a right drive shaft 51a and also with a left drive shaft 51b. Accordingly, the drive shaft 51a and 52b are parallel to the input shaft 13, the counter shaft 17 and the output shaft 12. The other parts and portions are similar to those of the first embodiment.

Therefore, the transmission 10 of the fourth embodiment has the same advantages as those of the first embodiment in addition to the following one.

The transmission of the fourth embodiment can be applied for an μF motor vehicle.

Next, a transmission of a fifth embodiment according to the present invention will be described below.

Figure 10:
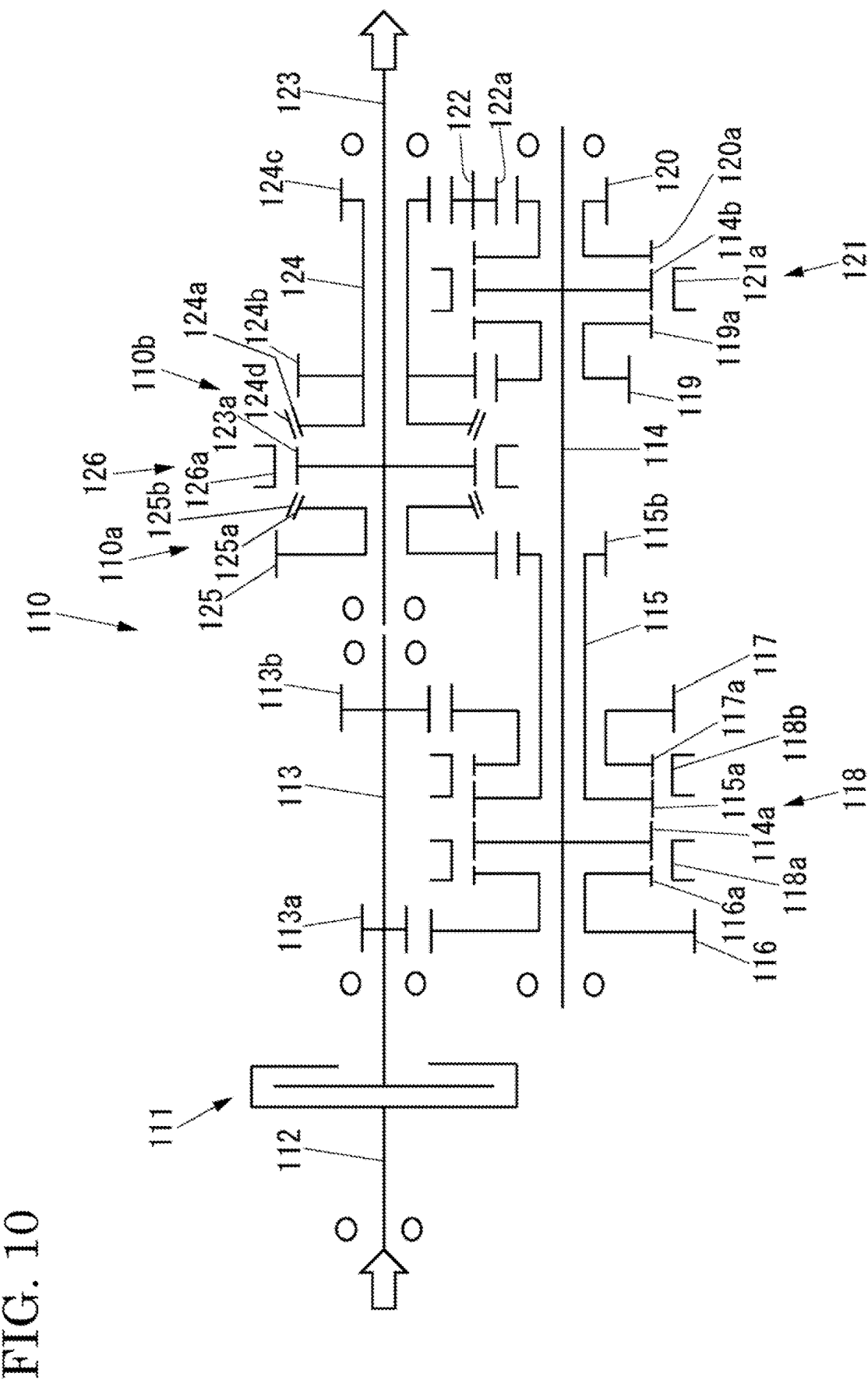
FIG. 10 is a schematic view showing an FR 4-speed parallel axis type transmission of a fifth embodiment according to the present invention.

As shown in FIG. 10, an input shaft 113 is connected with a crank shaft 112 through a starting clutch 111. The input shaft 113 has a first-second drive gear 113a and a third-fourth drive gear 113b as one unit.

A counter shaft 114 is arranged parallel to the input shaft 113. The counter shaft 114 has a hub portion 114a and a hub portion 114b.

A first-second driven gear 116 is formed with a dog clutch gear 116a as one unit, and they are freely rotatable on the counter shaft 114. A transferring drive gear 115b is formed with a dog clutch gear 115a and a first sub-shaft 115 as one unit, and they are freely rotatable on the counter shaft 114. A third-fourth driven gear 117 is formed with a dog clutch gear 117a as one unit, and they are freely rotatable on the first sub-shaft 115. A second-fourth drive gear 119 is formed with a dog clutch 119a as one unit, and they are freely rotatable on the counter shaft 114. A second-fourth driven gear 124b is engaged with the second-fourth drive gear 119.

A reverse drive gear 120 is formed with a dog clutch gear 120a as one unit. A reverse idle gear 122a is freely rotatable on a shaft 122 that is fixed on a not-shown transmission housing. A reverse driven gear 124c is engaged with the reverse idle gear 122a. The second-fourth driven gear 124b, a dog clutch gear 124a, the reverse driven gear 124c and a second sub-shaft 124 are formed with the second-fourth driven gear 124b and a dog clutch 124a as one unit, and they are freely rotatable on the output shaft 123.

A first shift sleeve 118a is always engaged with a hub portion 114a of the counter shaft 114, and it is selectively connected with one of the dog clutch gears 116a and 115a, being selectively not engaged with the dog clutch gears 116a and 115a. A second shift sleeve 118b is always engaged with a hub portion 115a of the first sub-shaft 115, and it is selectively connected with one of the hub portions 114a and 117a, being selectively not engaged with the hub clutch gears 114a and 117a. A third shift sleeve 121a is always engaged with the hub portion 114b of the counter shaft 114, and it is selectively engaged with the dog clutch gears 119a and 120a, being selectively not engaged with the dog clutch gears 119a and 120a.

A path shift sleeve 126a is always engaged with the hub portion 123a, and it is selectively engaged with the dog clutch gears 124a and 125a. In addition, the transferring driven gear 125 has a not-shown cone portion next to the dog clutch gear 125a, and the second-fourth driven gear 124b has a not-shown cone portion next to the dog clutch gear 124a. A synchronizer ring 124d is arranged between the hub portion 123a and the dog clutch gear 124a, and a synchronizer ring 126a is arranged between the hub portion 123a and the dog clutch gear 125a.

The first shift sleeve 118a, the hub portion 114a, the dog clutch gears 115a and 116a, the second shift sleeve 118b, the dog clutch gears 115a and 117a, the third shift sleeve 121a, the hub portion 114b and the dog clutch gear 119a correspond to a first gear shifting part 118 and a second gear shifting part 121 of the present invention.

The path shift sleeve 126, the hub portion 123a, the dog clutch gears 124a and 125a, the synchronizer rings 124d and 125b and the cone portions correspond to a path shifting part 126 of the present invention. The paths to obtain the first speed and the third speed correspond to a first power transmitting path of the present invention, and the paths to obtain the second speed and the fourth speed correspond to a second power transmitting path of the present invention.

The operation of the transmission 110 of the fifth embodiment will be described below.

In order to obtain a neutral position, the stating clutch 111 is released. The first shift sleeve 118a, the second shift sleeve 118b and the third shift sleeve 121a are positioned at neutral positions. The path shift sleeve 126a is engaged with 125a.

In order to obtain first speed, the starting clutch 111 is released. The first shift sleeve 118a is moved toward the left side to engage with the dog clutch gear 116a, and the second shift sleeve 118b is moved toward the left side to engage with the hub portion 114a. Incidentally, the second power shifting mechanism 121 is positioned at the neutral position. Then the path shift sleeve 126a is moved toward the left side to engage with the dog clutch gear 125a.

After the path shift sleeve 126a is shifted, the starting clutch 111 is slipped at first. The input shaft 113 is rotated to drive the first-second drive gear 113a. The first-second drive gear 113a rotates the first-second driven gear 116, which rotates the dog clutch gear 116a, the first shift sleeve 118a and the hub portion 114a. The hub portion 114a rotates the second shift sleeve 118b, which rotates the dog clutch gear 115a, the first sub-shaft 115 and the transferring drive gear 115b. The transferring drive gear 115b rotates the transferring driven gear 125 and the dog clutch gear 125a. The dog clutch gear 125a rotates the path shift sleeve 126a, which drives the hub portion 123a and the output shaft 123. That is, the output shaft 123 rotates at the first speed. The starting clutch 111 is completely engaged after its slippage.

In order to obtain second speed from the first speed, the first shift sleeve 118a is kept engaged with the dog clutch gear 116a, and the second shift sleeve 118b is moved toward the right side to disengage from the hub portion 114a. The third shift sleeve 121a is moved toward the left side to engage with dog clutch gear 119a. Then the path shift sleeve 126a is moved toward the right side to engage with dog clutch gear 124a.

While the path shift sleeve 116a is shifted, the starting clutch 111 is instantaneously released. Then the input shaft 113 drives the first-second drive gear 113a, which rotates the first-second driven gear 116, the dog clutch gear 116a, the first shift sleeve 118a, the hub portion 114a and the counter shaft 114. The counter shaft 114 rotates the hub portion 114b, the third shift sleeve 121a, the dog clutch gear 119a and the second-fourth drive gear 119. The second-fourth drive gear 119 drives the second-fourth driven gear 124a, the second sub-shaft 124 and the dog clutch gear 124a. The dog clutch gear 124a rotates the path shift sleeve 126a, the hub portion 123a and the output shaft 123. That is, the output shaft 123 rotates at the second speed.

In order to obtain third speed from the second speed, the first shift sleeve 118a is moved toward the right side to disengage from the dog clutch gear 116a, and the second shift sleeve 118b is moved toward the right side to engage with the dog clutch gear 117a. The third shift sleeve 121a is moved toward the right side to be positioned at the neutral position. Then the path shift sleeve 126a is moved toward the left side to engage with the dog clutch gear 125a.

While the path shift sleeve 116a is shifted, the starting clutch 111 is instantaneously released. Then the input shaft 113 drives the third-fourth drive gear 113b, which rotates the third-fourth driven gear 117, the dog clutch gear 117a, the second shift sleeve 118b, the dog clutch gear 115a, the first sub-shaft 115 and the transferring drive gear 115b. The transferring drive gear 115b rotates the transferring driven gear 125, which drives the dog clutch gear 125a, the path shift sleeve 126a, the hub portion 123a and the output shaft 123. That is, the output shaft 123 rotates at the third speed.

In order to obtain fourth speed from the third speed, the first shift sleeve 118a is moved further toward the right side to engage with the dog clutch gear 115a, and the second shift sleeve 118b is kept engaged with the dog gear clutch 117a. The third shift sleeve 121a is moved toward the left side to engage with the dog clutch gear 119a. Then the path shift sleeve 126a is moved toward the right side to engage the dog clutch gear 124a.

While the path shift sleeve 116a is shifted, the starting clutch 111 is instantaneously released. Then the input shaft 113 drives the third-fourth drive gear 113b, which rotates the third-fourth driven gear 117, the dog clutch gear 117a, the second shift sleeve 118b, the dog clutch gear 115a, the first shift sleeve 118a, the hub portion 114a and the counter shaft 114. The counter shaft 114 rotates the hub portion 114b, which rotates the third shift sleeve 121a, the dog clutch gear 119a and the second-fourth drive gear 119. The second-fourth drive gear 119 drives the second-fourth driven gear 124b, which rotates the dog clutch gear 124a, the path shift sleeve 126a, the hub portion 123a and the output shaft 123. That is, the output shaft 123 rotates at the fourth speed.

In order to obtain reverse speed, the starting clutch 111 is released. The first shift sleeve 118a is moved to the left side to engage with the dog clutch gear 116a, and the second shift sleeve 118b is positioned at the neutral position. The third shift sleeve 121a is moved toward the right side to engage with the dog clutch gear 120a. Then the path shift sleeve 126 is moved toward the right side to engage with the dog clutch gear 124a.

After the path shift sleeve 126a is shifted, the starting clutch 111 is slipped at first. The input shaft 113 drives the first-second drive gear 113a, which rotates the first-second driven gear 116, the dog clutch gear 116a, the first shift sleeve 118a, the hub portion 114a, and the counter shaft 114. The counter shaft 114 rotates the hub portion 114b, the third shift sleeve 121a, the dog clutch gear 120a and the reverse drive gear 120. The reverse drive gear 120 drives the reverse idle gear 122a, the reverse driven gear 124c. The reverse driven gear 124c rotates the second sub-shaft 124, the dog clutch gear 124a, the path shift sleeve 126a, the hub portion 123a and the output shaft 123. That is, the output shaft 123 rotates at the reverse speed. Incidentally, immediately after the path shift sleeve 116a is shifted, the starting clutch 111 is slipped and then it is completely engaged.

The transmission 110 of the fifth embodiment has the same advantages as those of the first embodiment in addition to the following one.

The transmission of the fifth embodiment can be arranged differently from the first to fourth embodiment.

Next, a transmission of a sixth embodiment according to the present invention will be described below.

Figure 11:
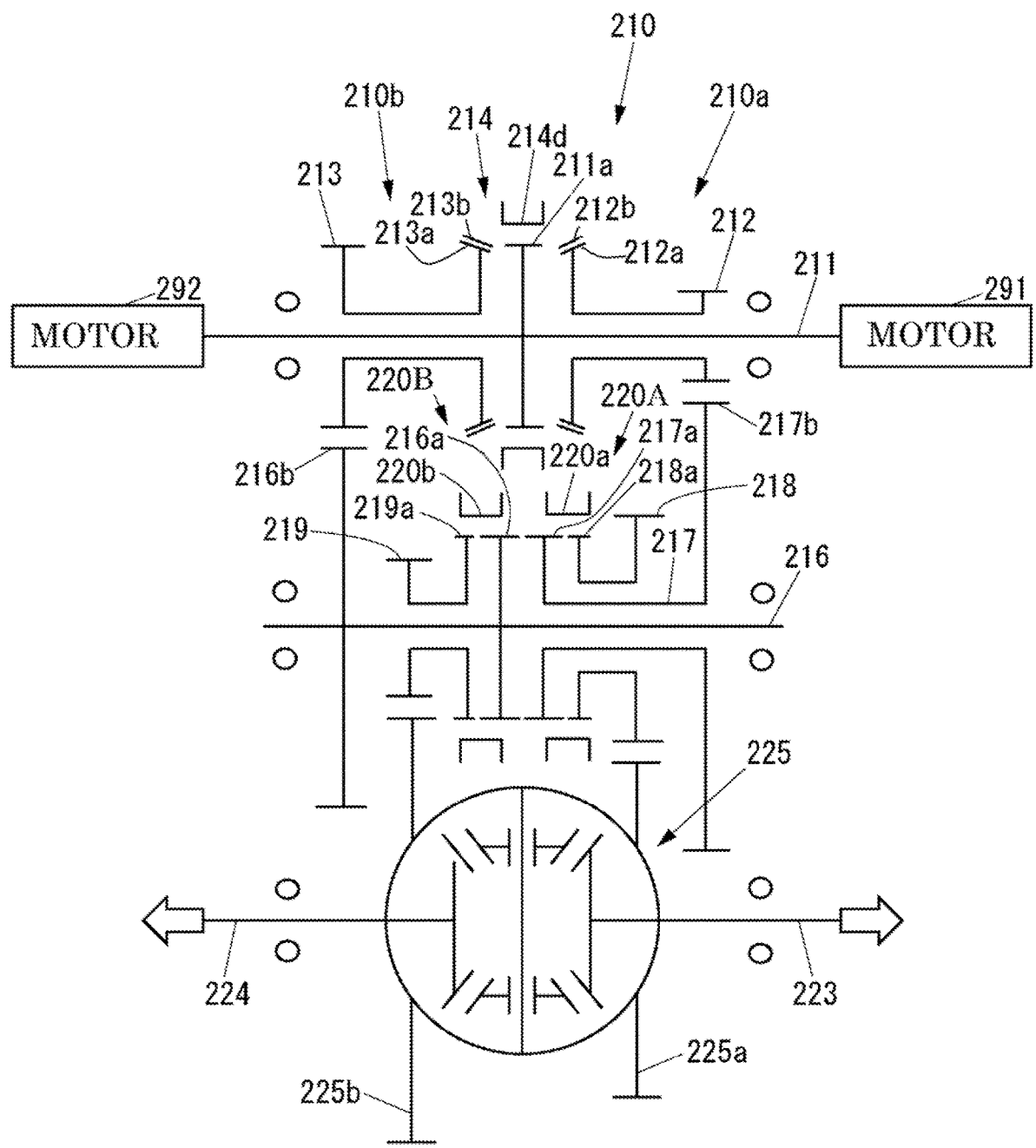
FIG. 11 is a schematic view showing the FF 4-speed parallel axis type transmission of a sixth embodiment according to the present embodiment.
Figure 12:
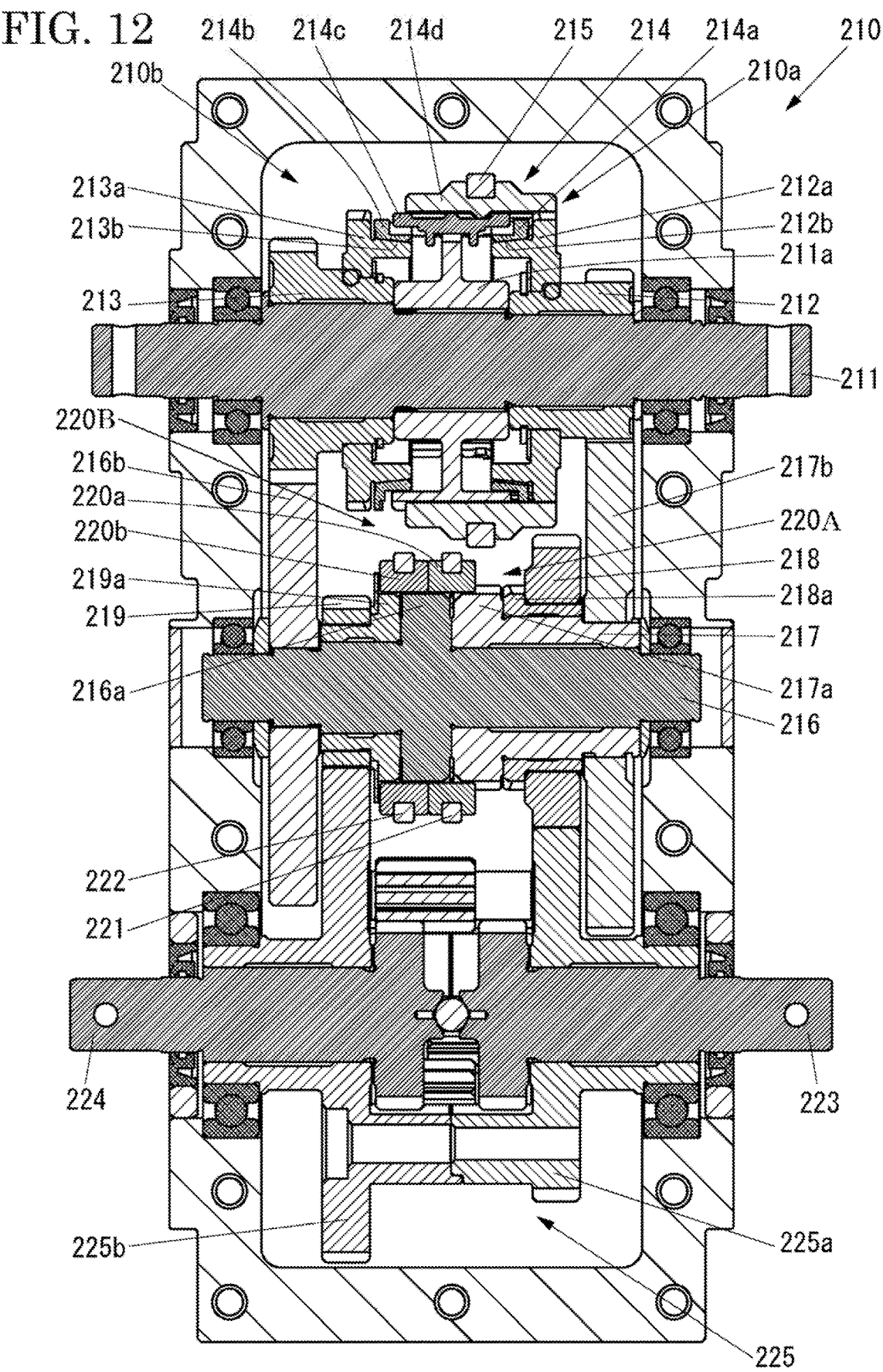
FIG. 12 is a cross-sectional side view showing the FF 4-speed parallel axis type transmission shown in FIG. 11 at first speed.

As shown in FIGS. 11 and 12, an input shaft 211 is connected with an electric motor/generator 291 and an electric motor/generator 292 at the both sides. The input shaft 211 is integrally formed with a hub 211a at its center position, and a radially outer portion of the hub 211a is formed with splines.

A first-third drive gear 212 is integrally formed with a dog clutch gear 212a, and they are freely rotatable on the input shaft 211. The dog clutch gear 211a is formed with a cone portion 212b projecting toward the hub 211a. A synchronizer ring 214a is arranged among the hub 211a, the dog clutch gear 212a and the cone portion 212b.

A second-fourth drive gear 213 is integrally formed with a dog clutch gear 213a, and they are freely rotatable on the input shaft 211. The dog clutch gear 213a is formed with a cone portion 213b projecting toward the hub 211a. A synchronizer ring 214b is arranged among the hub 211a, the dog clutch gear 213a and the cone portion 213b.

A plurality of synchronizer keys 214c are arranged among the synchronizer ring 214a, the synchronizer ring 214b and a path shift sleeve 214d. The path shift sleeve 214d is formed at its radially outer side with a circumferential groove, which receives a shift fork 215. It has a projecting portion extending in a radially inner direction. The synchronizer keys 214c are formed in an axial direction with two circumferential grooves, one of which is engaged with the projecting portion of the path shift sleeve 214d.

The path shift sleeve 214d is formed with splines on its inner surface, ant it is always engaged with the hub 211a. It is selectively engageable with one of the dog clutch gears 212a and 213a. It only shifts between a first position 210a where it is engaged with the dog clutch gear 212a and a second position 210b where it is engaged with the dog clutch gear 213a. There is no neutral position. The path shift sleeve 214d, the hub 211a, the dog clutch gears 212a and 213a, the synchronizer rings 212b and 213b and the cone portions 212b and 213b correspond to a path shifting part 214 of the present invention.

Incidentally, the path shift sleeve 214d is designed to have a length so that it can contact with the synchronizer 212b and the synchronizer ring 213b at the same time. Accordingly, when the path shift sleeve 214d is shifted from the dog clutch gear 212a to the dog clutch gear 213a, a transmission 210 can decrease time when the path shift sleeve 214d is disengaged from the dog clutch gear 212a and then the path shift sleeve 214d directly or indirectly pushes the synchronizer ring 213b against the cone portion 213b of the dog clutch gear 213a to contact and generate frictional torque.

Similarly, when the path shift sleeve 214d is shifted from the dog clutch gear 213a to the dog clutch gear 212a, the transmission 210 can decrease time when the path shift sleeve 214d is disengaged from the dog clutch gear 213a and then the path shift sleeve 214d directly or indirectly pushes the synchronizer ring 212b against the cone portion 212b of the dog clutch gear 212a to contact and generate frictional torque.

Therefore, the transmission 210 can suppress cutting off of power when the path shifting part 210 is shifted, so that a driver cannot feel free running of the motor vehicle.

In addition, the path shift sleeve 214d is designed to have a length so that, when it is shifted from the engaging state of the dog clutch gear 212a toward the dog clutch gear 213a, it can push the synchronizer ring 214b indirectly through the synchronizer keys 214c, at least before the path shift sleeve 214d is disengaged from the dog clutch gear 212a, to contact the synchronizer ring 214b with the cone portion 213b of the dog clutch gear 213a.

It is also designed to have the length so that, when it is shifted from the engaging state of the dog clutch gear 213a toward the dog clutch gear 212a, it can push the synchronizer ring 214a indirectly through the synchronizer keys 214c, at least before the path shift sleeve 214d is disengaged from the dog clutch gear 213a, to contact the synchronizer ring 214a with the cone portion 212b of the dog clutch gear 212a.

Therefore, the transmission 210 can suppress cutting off of power when the path shifting part 210 is shifted, so that a driver cannot feel free running of the motor vehicle.

Further, the path shift sleeve 214d is designed to have a maximum length so that the contact of the dog clutch gear 212a and the contact of the synchronizer ring 214b can cause at different time in a case where it is moved from the engaging state of the dog clutch gear 212a toward the dog clutch gear 213a. Similarly, it has the maximum length so that the contact of the dog clutch gear 213a and the contact of the synchronizer ring 214a can cause at different time in a case where it is moved from the engaging state of the dog clutch gear 213a toward the dog clutch gear 212a.

Due to this construction, in a case where the path shift sleeve 214d is shifted from the engaging state of the dog clutch gear 212a toward the dog clutch gear 213a, it directly pushes the synchronizer ring 214b to contact with the cone portion 213b of the dog clutch gear 213a and generate the frictional torque therebetween immediately after the path shift sleeve 214d is disengaged from the dog clutch gear 212a.

Similarly, in a case where the path shift sleeve 214d is shifted from the engaging state of the dog clutch gear 213a toward dog clutch gear 212a, it directly pushes the synchronizer ring 214a to contact the cone portion 213b of the dog clutch gear 212a and generate the frictional torque therebetween immediately after the path shift sleeve 214d is disengaged from the dog clutch gear 213a.

Therefore, the transmission 210 can suppress cutting of power when the path shifting part is shifted, so that a driver cannot feel free running of the motor vehicle.

A counter shaft 216 is arranged parallel to the input shaft 211. A first-third driven gear 217b is engaged with the first-third drive gear 212, and a second-fourth driven gear 216b is engaged with the second-fourth drive gear 213. The first-third driven gear 217b is integrally formed with a dog clutch gear 217a and a sub-shaft 217, and they are freely rotatable on the counter shaft 216. A second-fourth driven gear 216b is integrally formed with the counter shaft 216. The counter shaft 216 has a hub portion 216a as one unit, and its radially outer side is formed with splines.

A first-second drive gear 219 is integrally formed with a dog clutch gear 219a, and they are freely rotatable on the counter shaft 216. A third-fourth drive gear 218 is integrally formed with a dog clutch gear 218a, and they are freely rotatable on the sub-shaft 217.

A first-second driven gear 225b is engaged with the first-second drive gear 219, and a third-fourth driven gear 225a is engaged with the third-fourth drive gear 218. The first-second driven gear 225b and the third-fourth driven gear 225a are connected with differential gears 225, which are connected with a right drive shaft 223 and a left drive shaft 224.

A first shift sleeve 220a is formed at its radially outer side with a circumferential groove, which receives a shift fork 221. It is always engageable with the hub portion 216a, a dog clutch gear 217a and a dog clutch gear 218a, so that it is selectively engageable with the hub portion 216a and the dog clutch gear 217a, or being selectively engageable with the dog clutch gear 217a and the dog clutch gear 218a. The first sleeve 220a, the hub portion 216a, the dog clutch gear 217a and the dog clutch gear 218a correspond to a first gear shifting part 220A of the present invention.

A second shift sleeve 220b is formed at its radially outer side with a circumferential groove, which receives a shift fork 222. It is always engaged with the hub portion 216a, and it is selectively engageable with the dog clutch gear 219, being selectively engaged with the hub portion 216a and the dog clutch gear 217a. The second shift sleeve 220b, the hub portion 216a and the dog clutch gear 219a correspond to a second gear shifting part 220B of the present invention.

The operation of the transmission 210 of the sixth embodiment will be described below.

At a neutral position, the path shift sleeve 214d is engaged with the dog clutch gear 212a. The first shift sleeve 220a and the second shift sleeve 220b may be positioned anywhere, but the first shift sleeve 220a is engaged with the hub portion 216a and the dog clutch 217a, and the second shift sleeve 220b is engaged with the hub portion 216a and the dog clutch gear 219a in preparation for the next operation. The electric motors/generators are not running.

In order to obtain first speed, the first shift sleeve 220a is moved toward the left side to engage with the hub portion 216a and the dog clutch gear 217a. The second shift sleeve 220b is moved toward the left side to engage with the dog clutch gear 219a and the hub portion 216a. Then the path shift sleeve 214d is moved toward the right side to engage with the dog clutch gear 212a and the hub 211a.

The power from at least one of the electric motor/generator 291 and the electric motor/generator 292 flows to the input shaft 211, then to the hub 211a. The hub 211a rotates the path shift sleeve 214d, the dog clutch gear 212a, and the first-third drive gear 212. The first-third drive gear 212 drives the first-third driven gear 217b, the sub-shaft 217 and the dog clutch gear 217a. The dog clutch gear 217a rotates the first shift sleeve 220a, the hub portion 216a, the second sleeve 220b, the dog clutch gear 219a and the first-second drive gear 219. The first-second drive gear 219 rotates the first-second driven gear 225b, the differential gears 225 and the drive shafts 223 and 224 at the first speed. FIG. 12 shows a state at the first speed.

In order to obtain second speed from the first speed, the first shift sleeve 220a is engaged with the hub portion 216a and the dog clutch gear 217a, and the second shift sleeve 220b is engaged with the hub portion 216a and the dog clutch gear 219a. That is, its operation is the same as that at the first speed. Then the path shift sleeve 214d is moved toward the left side to engage with the dog clutch gear 213a and the hub 211a.

Figure 13:
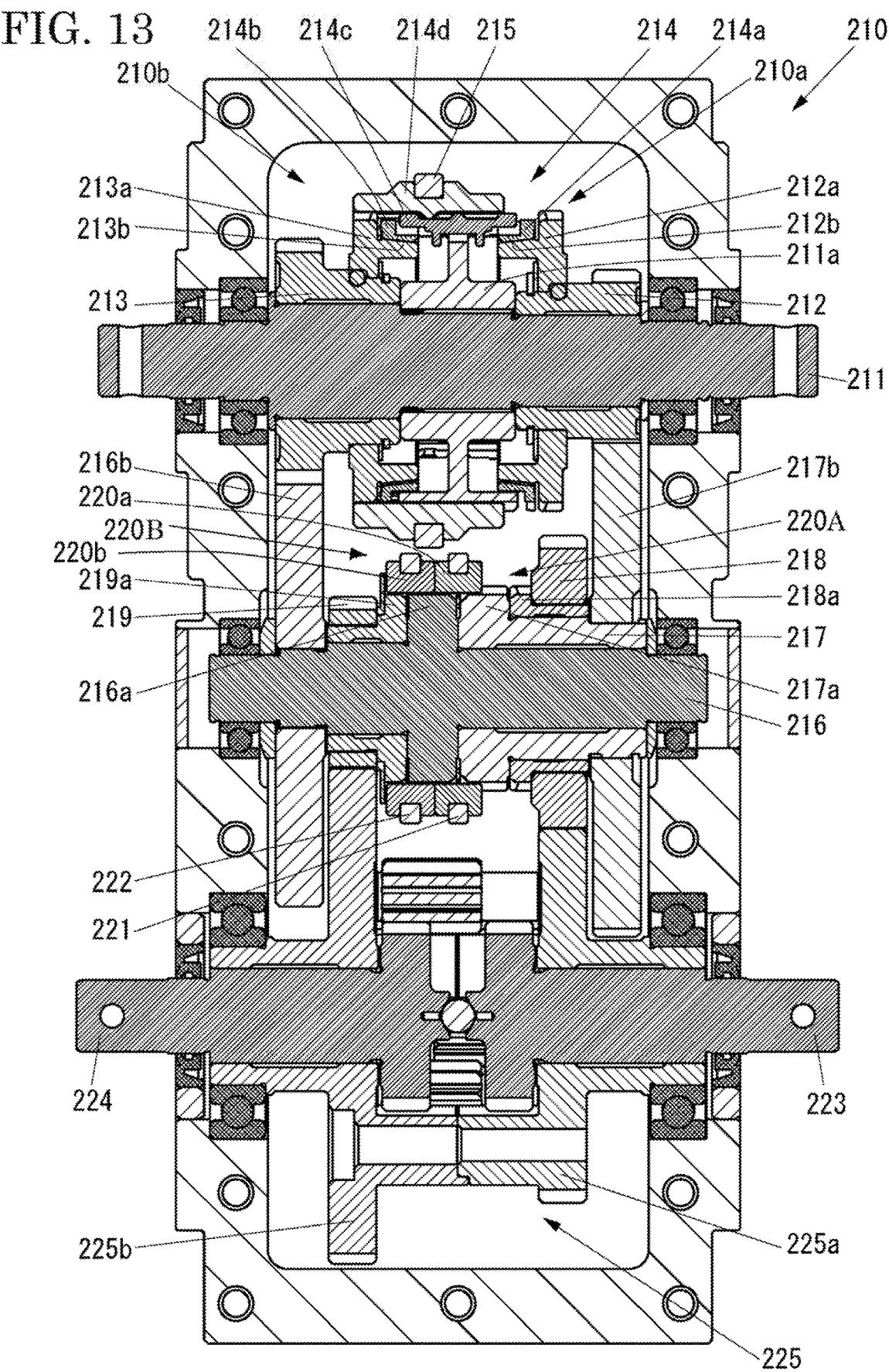
FIG. 13 is a cross-sectional side view showing the FF 4-speed parallel axis type transmission shown in FIG. 11 at second speed.

The power from at least one of the electric motors/generators 291 and 292 flows to the input shaft 211, then to the hub 211a. The hub 211a drives the path shift sleeve 214d, the dog clutch gear 213a and the second-fourth drive gear 213. The second-fourth drive gear 213 rotates the second-fourth driven gear 216b, the counter shaft 216 and the hub portion 216a. The hub portion 216a rotates the second shift sleeve 220b, the dog clutch gear 219a, and the first-second drive gear 219. The first-second drive gear 219 rotates the first-second driven gear 225b, the differential gears 225 and the drive shafts 223 and 224 at the second speed. FIG. 13 shows a state at the second speed.

In order to obtain third speed from the second speed, the first shift sleeve 220a is moved toward the right side to engage with the dog clutch gear 218a and the dog clutch gear 217a, and the second shift sleeve 220b may be kept engaged with the dog clutch gear 219a. Then the path shift sleeve 214d is moved toward the right side to engage with the dog clutch gear 212a and the hub 211a.

Figure 14:
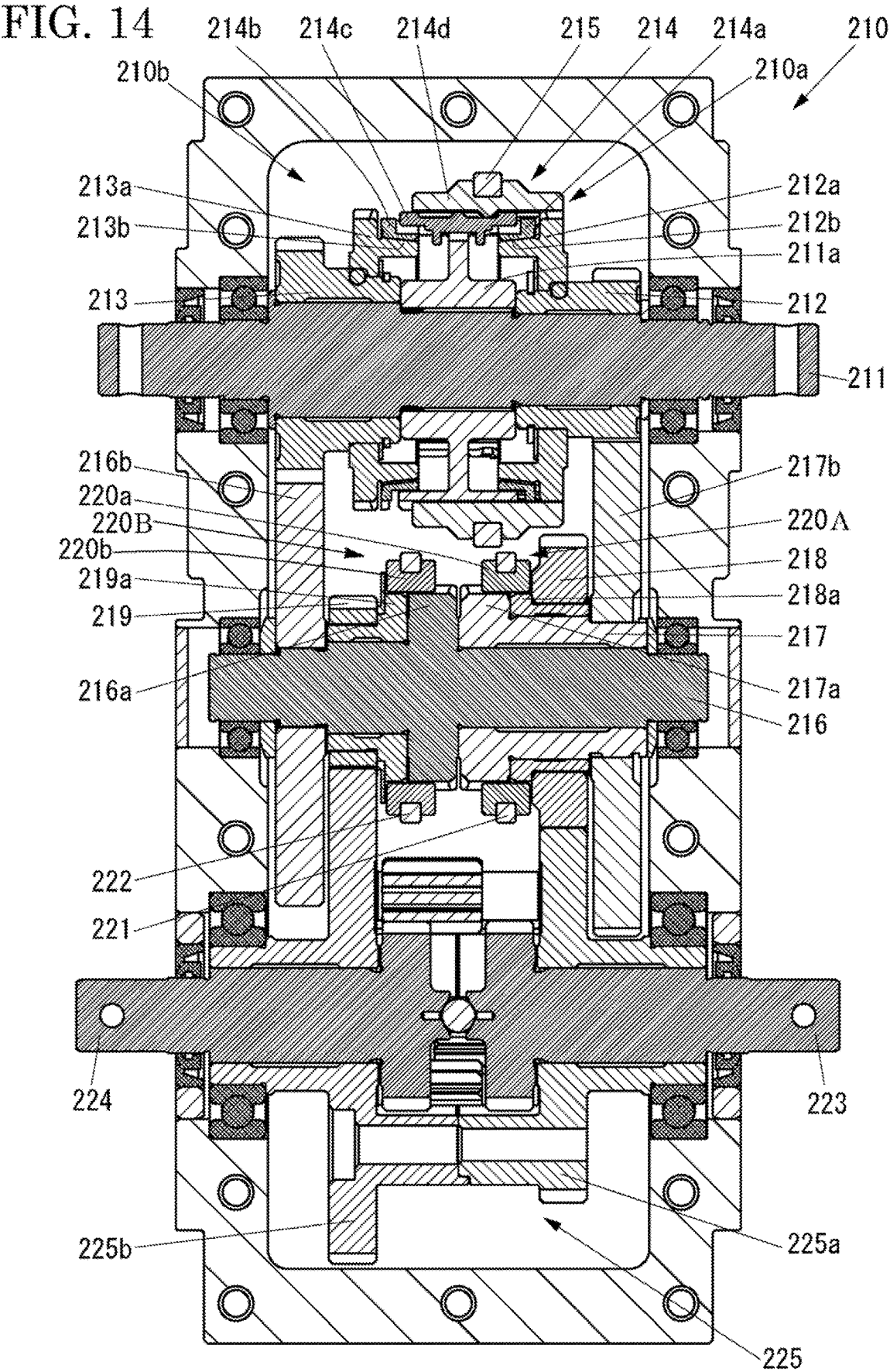
FIG. 14 is a cross-sectional side view showing the FF 4-speed parallel axis type transmission shown in FIG. 11 at third speed.

The power from at least one of the electric motors/generators 291 and 292 flows to the input shaft 211, then to the 211a. The hub 211a drives the path shift sleeve 214d, the dog clutch gear 212a and the first-third drive gear 212. The first-third drive gear 212 rotates the first-third driven gear 217b, the sub-shaft 217 and the dog clutch gear 217a. The dog clutch gear 217a rotates the first shift sleeve 220a, the dog clutch gear 218a and the third-fourth drive gear 218. The third-fourth drive gear 218 rotates the third-fourth driven gear 225a, the differential gears 225 and the drive shafts 223 and 224 at the third speed. FIG. 14 is a state at the third speed.

In order to obtain fourth speed from the third speed, the first shift sleeve 220a is engaged with the dog clutch gear 218a and the dog clutch gear 217a, and the second shift sleeve 220b is moved toward the right side to engage with the dog clutch gear 217a and the hub portion 216a. Then the path shift sleeve 214d is moved toward the left side to engage with the dog clutch gear 213a and the hub 211a.

Figure 15:
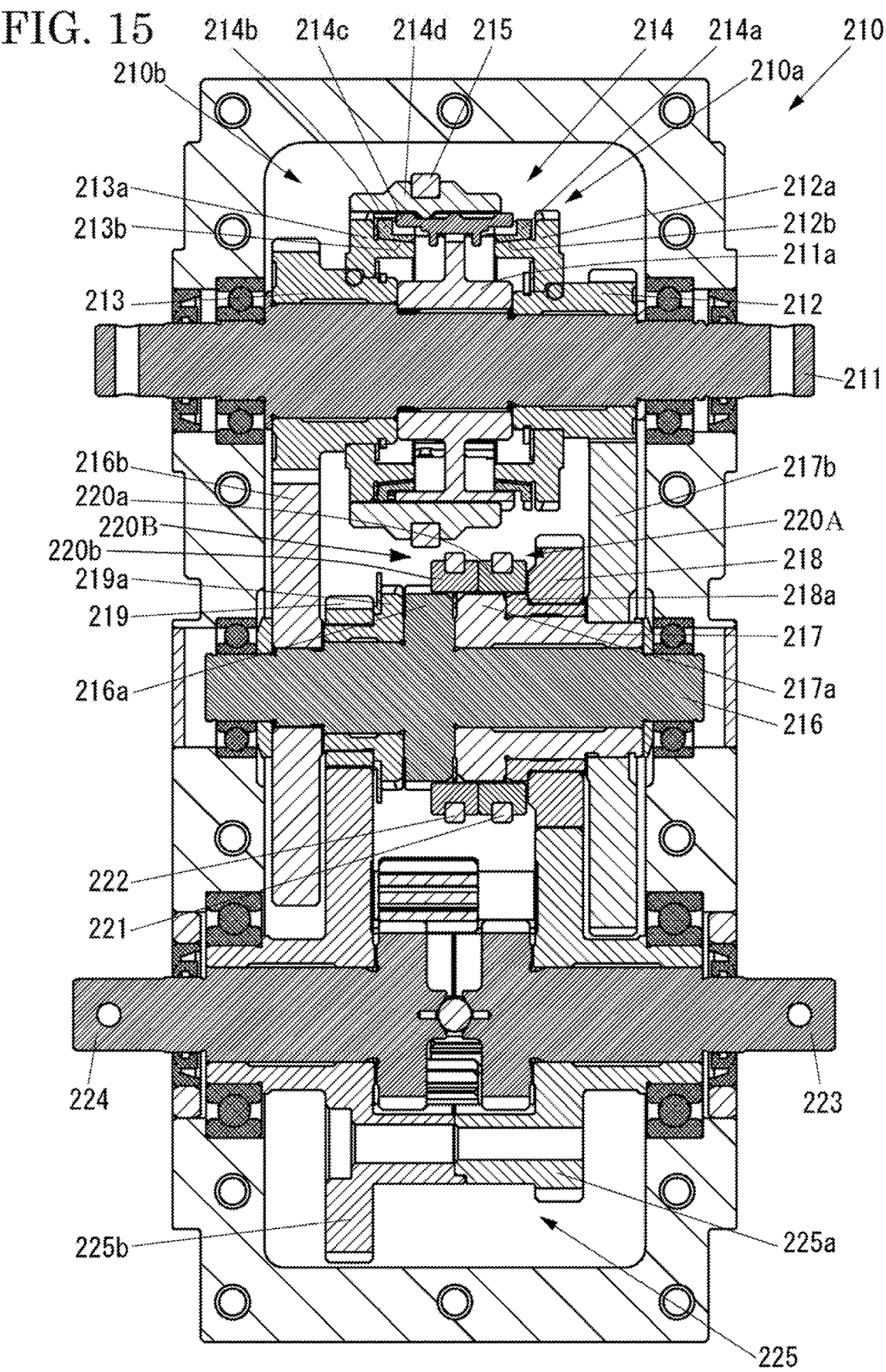
FIG. 15 is a cross-sectional side view showing the FF 4-speed parallel axis type transmission shown in FIG. 11 at fourth speed.

The power from at least one of the electric motors/generators 291 and 292 flows to the input shaft 211, then to the hub 211a. The hub 211a drives the path shift sleeve 214d, the dog clutch gear 213a and the second-fourth drive gear 213. The second-fourth drive gear 213 rotates the second-fourth driven gear 216b, the counter shaft 216 and the hub portion 216a. The hub portion 216a rotates the second shift sleeve 220b, the dog clutch gear 217a, the first shift sleeve 220a, the dog clutch gear 218a and the third-fourth drive gear 218. The third-fourth drive gear 218 rotates the third-fourth driven gear 225a, the differential gears 225 and the drive shafts 223 and 224 at the fourth speed. FIG. 15 is a state at the fourth speed.

In to obtain reverse speed, the first shift sleeve 220a, the second shift sleeve 220b and the path shift sleeve 214d are positioned at the same position as that at the first speed. Then at least one of the electric motors/generators 291 and 292 rotates in a reverse direction.

Figure 16:
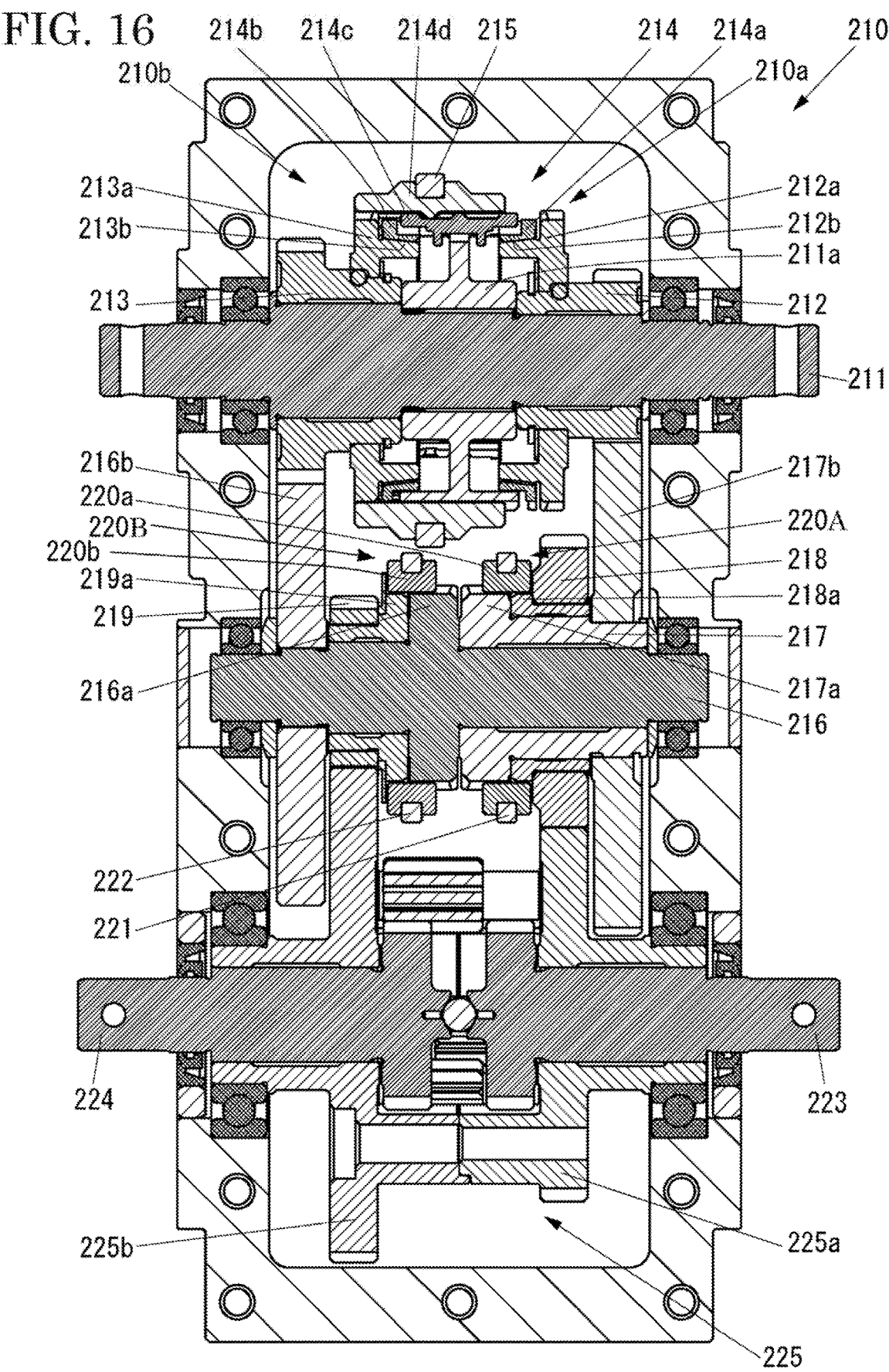
FIG. 16 is a cross-sectional side view showing the FF 4-speed parallel axis type transmission shown in FIG. 11 before shifting from the second speed to the third speed.

Shifting from the second speed to the third speed, the actuator 38 operates the first gear shifting part 220a to engage the first shift sleeve 220a with the dog clutch gear 218a as shown in FIG. 16. Then the actuator 38 operates to shift the path shifting part 214.

Figure 17:
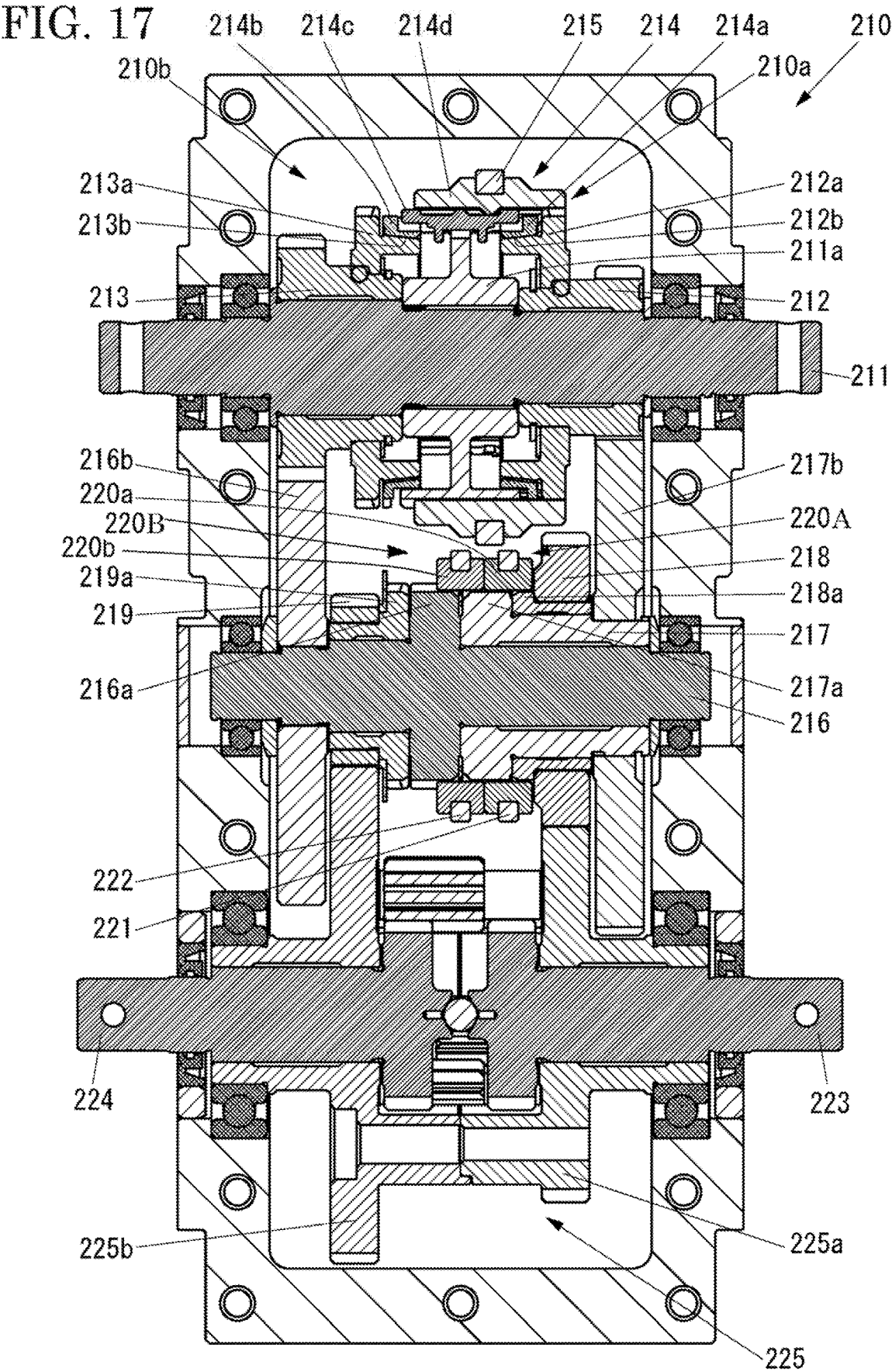
FIG. 17 is a cross-sectional side view showing the FF 4-speed parallel axis type transmission shown in FIG. 11 before shifting from the third speed to the fourth speed.

Shifting from the third speed to the fourth speed, the actuator 38 operates the second gear shifting part 220B to engage the second shift sleeve 220b with the dog clutch gear 217a as shown in FIG. 17. Then the actuator 38 operates to shift the path shifting part 214.

The transmission 210 of the sixth embodiment has the same advantages as those of the first embodiment in addition to the following one.

A reverse gear set is removed because the power unit is the electric motors/generators 291 and 292. The electric motors/generators 291 and 292 function to regenerate the power when the motor vehicle is braked. The path shifting part 214 can be quickly shifted because of the length of the path shift sleeve 214d.

While there have been particularly shown and described with reference to preferred embodiments thereof, it will be understood that various modifications may be made therein, and it is intended to cover in the appended claims all such modifications as fall within the true spirit and scope of the invention.

The path shifting part may be arranged at an end of a transmission in the axial direction.

The entire contents of Japanese Patent Applications No. 2016-103159 filed May 24, 2016 and No. 2017-084667 filed May 21, 2017 are incorporated herein by reference.

What is claimed is:
1. A parallel axis type transmission comprising:
one input shaft;
one output shaft;
a first power transmitting path including drive gears and driven gears, one of the drive gears or the driven gears of the first power transmitting path being rotatable around the one input shaft, and the first power transmitting path being capable of obtaining odd number speeds;
a second power transmitting path including drive gears and driven gears, at least part of one of the drive gears or the driven gears of the second power transmitting path being rotatable around the one input shaft, and the second power transmitting path being capable of obtaining even number speeds;

a first gear shifting part that is incorporated in the first power transmitting path to be shifted between drive and driven gear pairs of the first power transmitting path so as to be capable of obtaining one of the odd number speeds;

a second gear shifting part that is incorporated in the second power transmitting path to be shifted between drive and driven gear pairs of the second power transmitting path so as to be capable of obtaining one of the even number speeds; and a path shifting part that is arranged between the first power transmitting path and at least the part of the second power transmitting path and is capable of shifting from one of the first power transmitting path and the second power transmitting path to another of the first power transmitting path and the second power transmitting path to output power from the one input shaft to the one output shaft.

2. The parallel axis type transmission according to claim 1, wherein
at least the driven gears of the first power transmitting path are freely rotatable on a counter shaft, and at least the driven gears of the second power transmitting path are freely rotatable on the counter shaft.

3. The parallel axis type transmission according to claim 2, wherein
the one input shaft is connected with a power unit through a starting clutch that outputs the power to the first power transmitting path and the second power transmitting path.

4. The parallel axis type transmission according to claim 3, wherein
the path shifting part employs a synchro-mesh mechanism.

5. The parallel axis type transmission according to claim 4, wherein
at least one of the first gear shifting part and the second gear shifting part employs a shift sleeve, a hub portion which engages with the shift sleeve, and a dog clutch gear, having no synchronizer ring.

6. The parallel axis type transmission according to claim 5, wherein
both of the first gear shifting part and the second gear shifting part employs a shift sleeve, a hub portion which engages with the shift sleeve, and a dog clutch gear, having no synchronizer ring.

7. The parallel axis type transmission according to claim 1, wherein
the one input shaft is connected with a power unit through a starting clutch that outputs the power to the first power transmitting path and the second power transmitting path.

8. The parallel axis type transmission according to claim 7, wherein
the path shifting part employs a synchro-mesh mechanism.

9. The parallel axis type transmission according to claim 8, wherein
at least one of the first gear shifting part and the second gear shifting part employs a shift sleeve, a hub portion which engages with the shift sleeve, and a dog clutch gear, having no synchronizer ring.

10. The parallel axis type transmission according to claim 9, wherein
both of the first gear shifting part and the second gear shifting part employs a shift sleeve, a hub portion which engages with the shift sleeve, and a dog clutch gear, having no synchronizer ring.

11. The parallel axis type transmission according to claim 1, wherein
the path shifting part employs a synchro-mesh mechanism.

12. The parallel axis type transmission according to claim 11, wherein
at least one of the first gear shifting part and the second gear shifting part employs a shift sleeve, a hub portion which engages with the shift sleeve, and a dog clutch gear, having no synchronizer ring.

13. The parallel axis type transmission according to claim 12, wherein
both of the first gear shifting part and the second gear shifting part employs a shift sleeve, a hub portion which engages with the shift sleeve, and a dog clutch gear, having no synchronizer ring.

14. The parallel axis type transmission according to claim 1, wherein
at least one of the first gear shifting part and the second gear shifting part employs a shift sleeve, a hub portion which engages with the shift sleeve, and a dog clutch gear, having no synchronizer ring.

15. The parallel axis type transmission according to claim 14, wherein
both of the first gear shifting part and the second gear shifting part employs a shift sleeve, a hub portion which engages with the shift sleeve, and a dog clutch gear, having no synchronizer ring.

16. The parallel axis type transmission according to claim 1, wherein
both of the first gear shifting part and the second gear shifting part employs a shift sleeve, a hub portion which engages with the shift sleeve, and a dog clutch gear, having no synchronizer ring.

17. The parallel axis type transmission according to claim 1, wherein
the path shifting part shifts alternately between the odd number speeds and the even number speeds.

18. The parallel axis type transmission according to claim 2, wherein
the path shifting part shifts alternately between the odd number speeds and the even number speeds.

19. The parallel axis type transmission according to claim 3, wherein
the path shifting part shifts alternately between the odd number speeds and the even number speeds.

20. The parallel axis type transmission according to claim 4, wherein
the path shifting part shifts alternately between the odd number speeds and the even number speeds.

* * * * *